United States Patent
Matsumoto

(10) Patent No.: US 6,662,065 B2
(45) Date of Patent: Dec. 9, 2003

(54) METHOD OF MONITORING MANUFACTURING APPARATUS

(75) Inventor: Shigeru Matsumoto, Higashiosaka (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 155 days.

(21) Appl. No.: 09/809,085

(22) Filed: Mar. 16, 2001

(65) Prior Publication Data

US 2002/0026263 A1 Feb. 28, 2002

(30) Foreign Application Priority Data

Aug. 25, 2000 (JP) ........................................ 2000-255644

(51) Int. Cl.[7] .............................................. G06F 19/00
(52) U.S. Cl. ........................ 700/108; 700/108; 700/100
(58) Field of Search ...................... 700/95, 97, 99–103, 700/108, 111, 112, 114–116, 121, 174; 705/7, 9, 8

(56) References Cited

U.S. PATENT DOCUMENTS

| | | | |
|---|---|---|---|
| 4,888,692 A | * 12/1989 | Gupta et al. | 364/402 |
| 5,444,632 A | * 8/1995 | Kline et al. | 364/468 |
| 5,721,686 A | * 2/1998 | Shahraray et al. | 364/468.08 |
| 5,797,129 A | * 8/1998 | Rohan | 705/8 |
| 5,880,960 A | * 3/1999 | Lin et al. | 364/468.05 |
| 5,940,298 A | * 8/1999 | Pan et al. | 364/468.06 |
| 5,946,661 A | * 8/1999 | Rothschild et al. | 705/7 |
| 5,971,584 A | * 10/1999 | Iriuchijima et al. | 364/468.07 |
| 5,983,195 A | * 11/1999 | Fierro | 705/10 |
| 5,999,910 A | * 12/1999 | Rosenfeld et al. | 705/7 |
| 6,144,893 A | * 11/2000 | Van Der Vegt et al. | 700/108 |
| 6,243,612 B1 | * 6/2001 | Rippenhagen et al. | 700/100 |

* cited by examiner

Primary Examiner—Leo Picard
Assistant Examiner—Sean Shechtman
(74) Attorney, Agent, or Firm—Nixon & Peabody, LLP

(57) ABSTRACT

When the operation of any of manufacturing apparatus is halted, influence exerted by the operation halt on the manufacturing state of each of products is evaluated based on the difference between the number of products in a processing waiting state in the manufacturing apparatus at a time at which the operation of the manufacturing apparatus is halted or at a time antecedent thereto and the number of products in the processing waiting state in the manufacturing apparatus at a time at which the manufacturing apparatus is reoperated after the operation thereof is halted or at a time posterior thereto or on the difference between the period during which the product processed by the manufacturing apparatus during a given period antecedent to the time at which the operation of the manufacturing apparatus is halted is in the processing waiting state in the manufacturing apparatus and the period during which the product processed by the manufacturing apparatus during the given period posterior to the time at which the manufacturing apparatus is reoperated after the operation thereof is halted is in the processing waiting state in the manufacturing apparatus.

11 Claims, 20 Drawing Sheets

FIG. 2

Number-of-Processing-Waiting-Products Control Table

| Apparatus Name | Time | Number of Processing Waiting Products |
|---|---|---|
| : | : | : |
| E-1 | 2000/5/2 18:22 | 6 |
| E-1 | 2000/5/2 18:23 | 6 |
| E-1 | : | : |
| E-1 | 2000/5/3 04:03 | 15 |
| E-1 | 2000/5/3 04:04 | 15 |
| E-1 | 2000/5/3 04:05 | 14 |
| : | : | : |
| E-2 | 2000/4/30 14:12 | 3 |
| E-2 | 2000/4/30 14:13 | 4 |
| E-2 | : | : |
| E-2 | 2000/4/30 18:07 | 17 |
| E-2 | 2000/4/30 18:08 | 18 |
| : | : | : |

FIG. 3

Apparatus-Halt-State Control Table

| Apparatus Name | Operation Halt Time | Reoperation Time |
|---|---|---|
| : | : | : |
| E−1 | 2000/4/1 01:13 | 2000/4/2 02:02 |
| E−1 | 2000/5/2 18:23 | 2000/5/3 04:04 |
| : | : | : |
| E−2 | 2000/4/30 14:13 | 2000/4/30 18:07 |
| : | : | : |

FIG. 7

Product-Processing Control Table

| Apparatus Name | Processing Time | Processing Waiting Period (min.) |
|---|---|---|
| : | : | : |
| E-1 | 2000/5/2 17:01 | 38 |
| E-1 | 2000/5/2 17:42 | 43 |
| E-1 | 2000/5/2 18:22 | 29 |
| E-1 | 2000/5/3 04:05 | 659 |
| E-1 | 2000/5/3 04:47 | 643 |
| E-1 | 2000/5/3 05:12 | 600 |
| : | : | : |
| E-2 | 2000/4/30 13:18 | 65 |
| E-2 | 2000/4/30 14:03 | 57 |
| E-2 | 2000/4/30 18:10 | 232 |
| E-2 | 2000/4/30 18:37 | 126 |
| E-2 | 2000/4/30 18:59 | 56 |
| : | : | : |

FIG. 15

Number-of-Processing-Waiting-Products Control Table

| Apparatus Name | Time | Processing Priority | Number of Processing Waiting Products |
|---|---|---|---|
| ⋮ | ⋮ | ⋮ | ⋮ |
| E−1 | 2000/5/2 18:22 | A | 2 |
| E−1 | 2000/5/2 18:22 | B | 4 |
| E−1 | 2000/5/2 18:23 | A | 2 |
| E−1 | 2000/5/2 18:23 | B | 4 |
| E−1 | ⋮ | ⋮ | ⋮ |
| E−1 | 2000/5/3 04:03 | A | 3 |
| E−1 | 2000/5/3 04:03 | B | 12 |
| E−1 | 2000/5/3 04:04 | A | 3 |
| E−1 | 2000/5/3 04:04 | B | 12 |
| E−1 | 2000/5/3 04:05 | A | 2 |
| E−1 | 2000/5/3 04:05 | B | 12 |
| ⋮ | ⋮ | ⋮ | ⋮ |
| E−2 | 2000/4/30 14:12 | A | 0 |
| E−2 | 2000/4/30 14:12 | B | 3 |
| E−2 | 2000/4/30 14:13 | A | 1 |
| E−2 | 2000/4/30 14:13 | B | 3 |
| E−2 | ⋮ | ⋮ | ⋮ |
| E−2 | 2000/4/30 18:07 | A | 7 |
| E−2 | 2000/4/30 18:07 | B | 10 |
| E−2 | 2000/4/30 18:08 | A | 8 |
| E−2 | 2000/4/30 18:08 | B | 10 |
| ⋮ | ⋮ | ⋮ | ⋮ |

FIG. 16

Product-Processing Control Table

| Apparatus Name | Processing Time | Processing Priority | Processing Waiting Period (min.) |
|---|---|---|---|
| : | : | : | : |
| E-1 | 2000/5/2 17:01 | A | 38 |
| E-1 | 2000/5/2 17:42 | B | 43 |
| E-1 | 2000/5/2 18:22 | A | 29 |
| E-1 | 2000/5/3 04:05 | A | 659 |
| E-1 | 2000/5/3 04:47 | B | 643 |
| E-1 | 2000/5/3 05:12 | B | 600 |
| : | : | : | : |
| E-2 | 2000/4/30 13:18 | B | 65 |
| E-2 | 2000/4/30 14:03 | B | 57 |
| E-2 | 2000/4/30 18:10 | A | 232 |
| E-2 | 2000/4/30 18:37 | A | 126 |
| E-2 | 2000/4/30 18:59 | B | 56 |
| : | : | : | : |

METHOD OF MONITORING MANUFACTURING APPARATUS

BACKGROUND OF THE INVENTION

The present invention relates to a method of monitoring manufacturing apparatus for monitoring the operating state of each of a plurality of manufacturing apparatus used sequentially to manufacture a plurality of products of different processing priorities or different types in a manufacturing line, e.g., a manufacturing line for electronic devices such as Large Scale Integration (LSI). More particularly, it relates to a method of monitoring manufacturing apparatus for evaluating, when the operation of any of the manufacturing apparatus is halted due to trouble occurring therein or maintenance thereof, influence exerted by the operation halt on the manufacturing state of each of products.

In a conventional method of monitoring manufacturing apparatus, influence exerted by an operation halt of each of the manufacturing apparatus on the manufacturing state of each of products (hereinafter referred to as halt influence) has been evaluated by monitoring an operation halt period of the manufacturing apparatus (a period between an operation halt and reoperation) or the number of operation halts.

Specifically, in a manufacturing line composed of a plurality of manufacturing apparatus, the operation halt period or the number of operation halts of each of the manufacturing apparatus is stored in a database based on apparatus halt data (the operating state of each of the manufacturing apparatus or the cause of the operating state) transmitted from each of the manufacturing apparatus. The total operation halt period or the total number of operation halts of each of the manufacturing apparatus is calculated on a, e.g., monthly basis and a manufacturing apparatus having a longer total operation halt period or a larger total number of operation halts has been evaluated to have received greater halt influence.

In short, the conventional method of monitoring manufacturing apparatus has evaluated the halt influence based only on the length of the operation halt period of the manufacturing apparatus and on the frequency of operation halts thereof.

In a typical manufacturing line, however, an apparatus operability differs from one manufacturing apparatus to another. The apparatus operability is defined herein as a proportion of a period during which a manufacturing apparatus operates for product processing (hereinafter referred to as a product processing period) to a given period of time. If the period during which the manufacturing apparatus is not in operation during the given period is assumed to be an apparatus idle time, the apparatus operability can be given by, e.g., the following equation:

Apparatus Operability=Product Processing Period/(Product Processing Period+Apparatus Idle Time).

Accordingly, a higher apparatus operability indicates a higher utilization factor (a higher degree of busyness) of the manufacturing apparatus.

However, since the conventional method of monitoring manufacturing apparatus has evaluated the halt influence based only on the length of the operation halt period of the manufacturing apparatus or on the frequency of operation halts thereof, the following problems arise if the conventional method of monitoring manufacturing apparatus is implemented with respect to a manufacturing line for electronic devices or the like in which the apparatus operability differs greatly from one manufacturing apparatus to another.

(1) Because of the different operabilities of the manufacturing apparatus, it is difficult to precisely evaluate the halt influence based on the length of the operation halt period of each of the manufacturing apparatus. For example, even when a manufacturing apparatus has a long operation halt period, the halt influence is negligible if the degree of busyness of the manufacturing apparatus is low during the operation halt period. Conversely, even when a manufacturing apparatus has a short operation halt period, the halt influcence is great if the degree of busyness of the manufacturing apparatus is high during the operation halt period.

(2) Because of the different operabilities of the manufacturing apparatus, it is difficult to precisely evaluate the halt influence based on the frequency of operation halts of the manufacturing apparatus. For example, even when a manufacturing apparatus has a large number of operation halts, the halt influence is negligible if the degree of busyness of the manufacturing apparatus is low during each of the operation halt periods. Conversely, even when a manufacturing apparatus has a small number of operation halts, the halt influcence is great if the degree of busyness of the manufacturing apparatus is high during each of the operation halt periods.

SUMMARY OF THE INVENTION

In view of the foregoing, it is therefore an object of the present invention to enable precise evaluation of halt influcence exerted by an operation halt of any of manufacturing apparatus on the manufacturing state of each of products.

To attain the object, a first method of monitoring manufacturing apparatus according to the present invention assumes a method of monitoring manufacturing apparatus for evaluating, when operation of any of the manufacturing apparatus used to manufacture a plurality of products is halted, influence exerted by the operation halt on a manufacturing state of each of the plurality of products as a halt influence by monitoring an operating state of each of the manufacturing apparatus, the method comprising the step of: evaluating the halt influence based on a difference between a first number of processing waiting products and a second number of processing waiting products, the first number of processing waiting products being a number of products of the plurality of products which are in a processing waiting state in the manufacturing apparatus at a time at which the operation of the manufacturing apparatus is halted or at a time antecedent thereto, the second number of processing waiting products being a number of products of the plurality of products which are in the processing waiting state in the manufacturing apparatus at a time at which the manufacturing apparatus is reoperated after the operation thereof is halted or at a time posterior thereto.

In accordance with the first method of monitoring manufacturing apparatus, the halt influence is evaluated based on the difference between the first number of processing waiting products before the operation of the manufacturing apparatus is halted and the second number of processing waiting products after the manufacturing apparatus is reoperated. Since the halt influence is evaluated by using the change in the number of processing waiting products during the operation halt period of the manufacturing apparatus, the halt influence can be evaluated in consideration of the busyness of the manufacturing apparatus during the operation halt period thereof. This allows precise evaluation of the halt influence even in a manufacturing line for electronic devices or the like in which busyness differs greatly from one manufacturing apparatus to another.

In the first method of monitoring manufacturing apparatus, the halt influence is preferably judged to be greater as a value obtained by subtracting the first number of processing waiting products from the second number of processing waiting products is larger.

This allows easy evaluation of the halt influence.

A second method of monitoring manufacturing apparatus according to the present invention assumes a method of monitoring manufacturing apparatus for evaluating, when operation of any of the manufacturing apparatus used to manufacture a plurality of products is halted, influence exerted by the operation halt on a manufacturing state of each of the plurality of products as a halt influence by monitoring an operating state of each of the manufacturing apparatus, the method comprising the step of: evaluating the halt influence based on a difference between a first processing waiting period and a second processing waiting period, the first processing waiting period being a period during which a product of the plurality of products which is processed by the manufacturing apparatus during a given period antecedent to a time at which the operation of the manufacturing apparatus is halted is in a processing waiting state in the manufacturing apparatus, the second processing waiting period being a period during which a product of the plurality of products which is processed by the manufacturing apparatus during the given period posterior to a time at which the manufacturing apparatus is reoperated after the operation thereof is halted is in the processing waiting state in the manufacturing apparatus.

In accordance with the second method of monitoring manufacturing apparatus, the halt influence is evaluated based on the difference between the first processing waiting period before the operation of the manufacturing apparatus is halted and the second processing waiting period after the manufacturing apparatus is reoperated. Since the halt influence is evaluated by using the change in processing waiting period during the operation halt period of the manufacturing apparatus, the halt influence can be evaluated in consideration of the busyness of the manufacturing apparatus during the operation halt period thereof. This allows precise evaluation of the halt influence even in a manufacturing line for electronic devices or the like in which busyness differs greatly from one manufacturing apparatus to another.

In the second method of monitoring manufacturing apparatus, the halt influence is preferably judged to be greater as a value obtained by subtracting the first processing waiting period from the second processing waiting period is larger.

This allows easy evaluation of the halt influence.

A third method of monitoring manufacturing apparatus according to the present invention assumes a method of monitoring manufacturing apparatus for evaluating, when operation of any of the manufacturing apparatus used to manufacture a plurality of products is halted, influence exerted by the operation halt on a manufacturing state of each of the plurality of products as a halt influence by monitoring an operating state of each of the manufacturing apparatus, the method comprising the steps of: calculating a first degree of influence based on a value obtained by subtracting, from a number of products of the plurality of products which are in a processing waiting state in the manufacturing apparatus at a time at which the manufacturing apparatus is reoperated after the operation thereof is halted or at a time posterior thereto, a number of products of the plurality of products which are in the processing waiting state in the manufacturing apparatus at a time at which the operation of the manufacturing apparatus is halted or at a time antecedent thereto; calculating a second degree of influence based on a value obtained by subtracting, from a period during which a product of the plurality of products which is processed by the manufacturing apparatus during a given period posterior to the time at which the manufacturing apparatus is reoperated after the operation thereof is halted is in the processing waiting state in the manufacturing apparatus, a period during which a product of the plurality of products which is processed by the manufacturing apparatus during the given period antecedent to the time at which the operation of the manufacturing apparatus is halted is in the processing waiting state in the manufacturing apparatus; and evaluating the halt influence based on the first and second degrees of influence.

In accordance with the third method of monitoring manufacturing apparatus, the first degree of influence is calculated based on the value obtained by subtracting, from the number of processing waiting products after the manufacturing apparatus is reoperated, the number of processing waiting products before the operation of the manufacturing apparatus is halted, the second degree of influence is calculated based on the value obtained by subtracting, from the processing waiting period after the manufacturing apparatus is reoperated, the processing waiting period before the operation of the manufacturing apparatus is halted, and then the halt influence is evaluated based on the first and second degrees of influence. Since the halt influence is evaluated by using the change in the number of processing waiting products and the change in processing waiting period during the operation halt period of the manufacturing apparatus, the halt influence can be evaluated in consideration of the busyness of the manufacturing apparatus during the operation halt period thereof. This allows precise evaluation of the halt influence even in a manufacturing line for electronic devices or the like in which busyness differs greatly from one manufacturing apparatus to another. This also allows more precise evaluation of the halt influence than in the case where the halt influence is evaluated by using either one of the change in the number of processing waiting products and the change in processing waiting period during the operation halt period of the manufacturing apparatus.

In the second or third method of monitoring manufacturing apparatus, the given period is preferably determined based on a time required for product processing performed by the manufacturing apparatus.

This allows the processing waiting period to be calculated in accordance with the time required for product processing performed by the manufacturing apparatus.

In this case, the given period is preferably determined to be longer as the time required for product processing performed by the manufacturing apparatus is longer.

This ensures the obtention of the processing waiting period.

In the third method of monitoring manufacturing apparatus, the step of evaluating the halt influence preferably includes providing at least one of the first and second degrees of influence with a weight based on a characteristic of the manufacturing apparatus and then evaluating the halt influence by using the first and second degrees of influence with the weight.

This allows the halt influence to be evaluated in accordance with the characteristic of each of the manufacturing apparatus even in a manufacturing line composed of a plurality of manufacturing apparatus of entirely different types, properties, performances, or the like.

In this case, the step of evaluating the halt influence preferably includes, when at least one of the first and second degrees of influence is provided with the weight, providing the second degree of influence with a larger weight as a time required for product processing performed by the manufacturing apparatus is longer.

This allows more precise evaluation of the halt influence.

In the third method of monitoring manufacturing apparatus, the step of calculating the first degree of influence preferably includes calculating the first degree of influence in association with each of priorities with which product processing is performed by the manufacturing apparatus, the step of calculating the second degree of influence includes calculating the second degree of influence in association with each of the priorities, and the step of evaluating the halt influence includes calculating a third degree of influence in association with each of the priorities based on the corresponding ones of the first and second degrees of influence calculated in association with the individual priorities and evaluating the halt influence based on each of the third degrees of influence calculated in association with the individual priorities.

This allows precise evaluation of the halt influence even in a manufacturing line for manufacturing a plurality of products of different processing priorities.

In this case, the step of evaluating the halt influence preferably includes, when the halt influence is evaluated based on each of the third degrees of influence calculated in association with the individual priorities, providing each of the third degrees of influence with a weight according to a height of the corresponding one of the priorities, summing up the third degrees of influence each provided with the weight, and evaluating the halt influence based on the total sum.

This allows more precise evaluation of the halt influence considering actual conditions in the manufacturing line, including the different processing priorities of the individual products.

BRIEF DESCRIPTION OF THE DRAWINGS

FIG. 2 is a view showing an example of a number-of-processing-waiting-products control table used in the method of monitoring manufacturing apparatus according to the first or third embodiment of the present invention;

FIG. 3 is a view showing an example of an apparatus-halt-state control table used in the methods of monitoring manufacturing apparatus according to the first to fourth embodiments of the present invention;

FIG. 7 is a view showing an example of a product-processing control table used in the method of monitoring manufacturing apparatus according to the second or third embodiment;

FIG. 15 is a view showing an example of a number-of-processing-waiting-products control table used in the method of monitoring manufacturing apparatus according to the fourth embodiment;

FIG. 16 is a view showing an example of a product-processing control table used in the method of monitoring manufacturing apparatus according to the fourth embodiment;

DETAILED DESCRIPTION OF THE INVENTION

Embodiment 1

Figure 1:
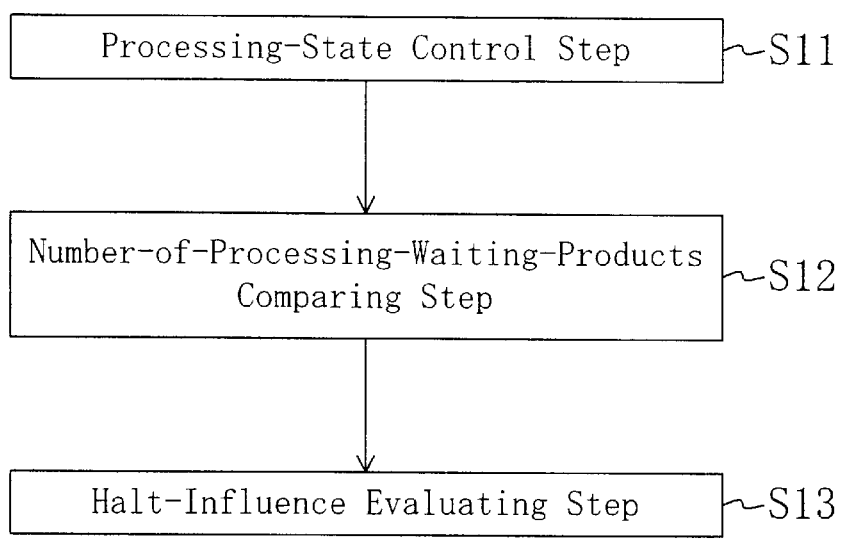
FIG. 1 is a flow chart of a method of monitoring manufacturing apparatus according to a first embodiment of the present invention.

Referring to the drawings, a method of monitoring manufacturing apparatus according to a first embodiment of the present invention will be described by using the exemplary case of evaluating, when the operation of any of a plurality of manufacturing apparatus used sequentially in an LSI manufacturing line to manufacture a plurality of products of different processing priorities or different types is halted, halt influence exerted by the operation halt on the manufacturing state of each of the products by monitoring the operating state of each of the manufacturing apparatus.

FIG. 1 is a flow chart of the method of monitoring manufacturing apparatus according to the first embodiment.

Processing-State Control Step (Step S11)

First, in Step S11, the number of products in a processing waiting state in each of the manufacturing apparatus (hereinafter referred to as the number of processing waiting products) and the operation halt state of each of the manufacturing apparatus are examined by monitoring the operating state of each of the manufacturing apparatus in the LSI manufacturing line.

Specifically, the number of processing waiting products in each of the manufacturing apparatus is registered at given time intervals of, e.g., one minute in a record of a number-of-processing-waiting-products control table on a computer memory having, as items, at least an apparatus name, a time, and the number of processing waiting products, as shown in FIG. 2.

On the other hand, the time at which the operation of each of the manufacturing apparatus is halted due to trouble occurring therein, maintenance thereof, or the like (hereinafter referred to as operation halt time) and the time at which the manufacturing apparatus is reoperated after the operation thereof is halted (hereinafter referred to as a reoperation time) are registered in a record of an apparatus-halt-state control table on a computer memory having, as items, at least an apparatus name, an operation halt time, and a reoperation time, as shown in FIG. 3.

Number-of-Processing-Waiting-Products Comparing Step (Step S12)

Next, in Step S12, a change in the number of processing waiting products is obtained by comparing the numbers of processing waiting products before and after the operation halt period of each of the manufacturing apparatus.

Figure 4:
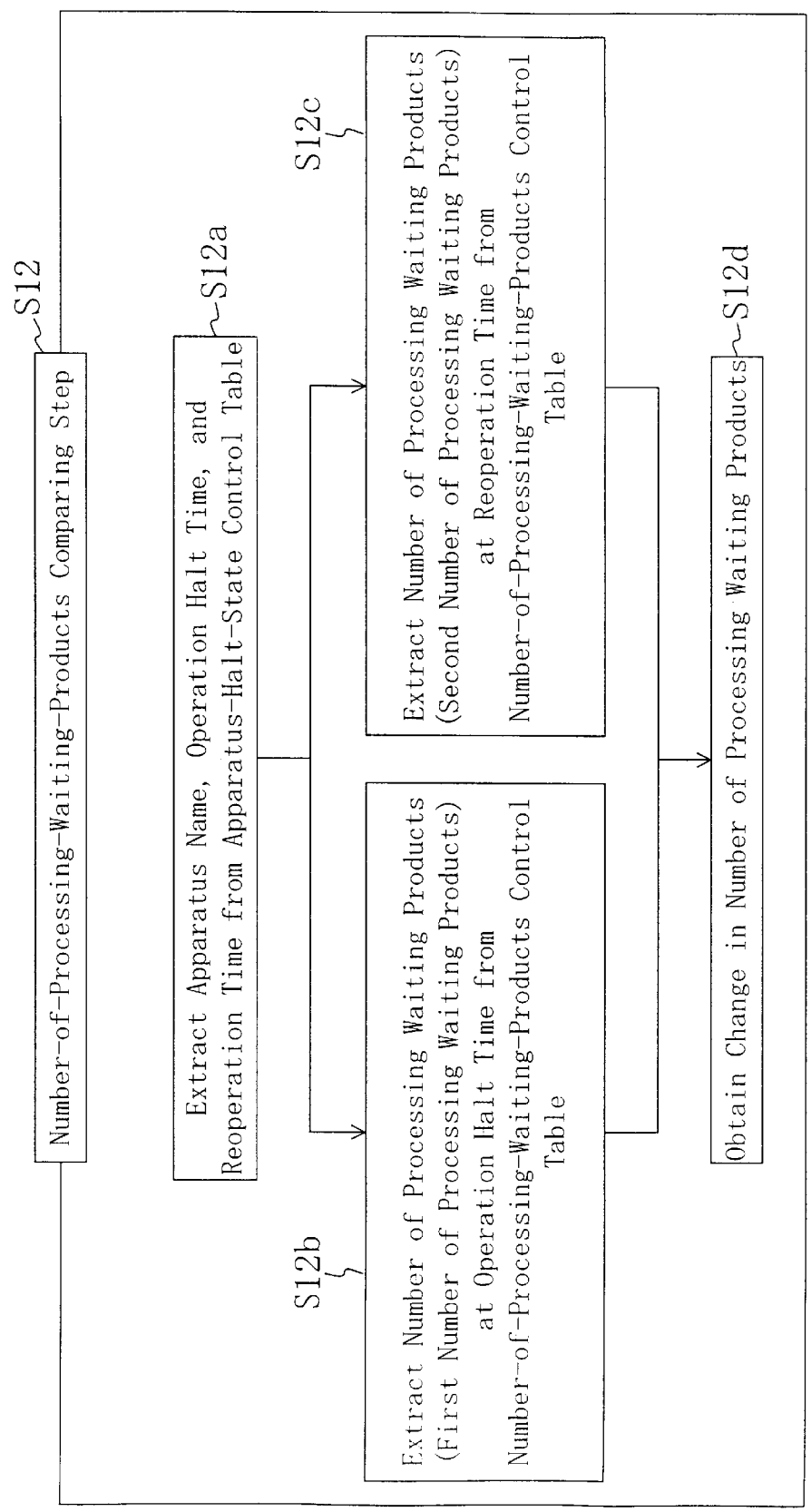
FIG. 4 is a flow chart illustrating the individual substeps of a number-of-processing-waiting-products comparing step in the method of monitoring manufacturing apparatus according to the first embodiment.

A specific description will be given to Step S12 with reference to FIG. 4.

In Step S12a, when the reoperation time is registered in the apparatus-halt-state control table shown in FIG. 3, the registered reoperation time, the apparatus name, and the operation halt time, each corresponding to the registered reoperation time, are extracted from the apparatus-halt-state control table.

In Step S12b, the number of processing waiting products at the extracted operation halt time of the manufacturing apparatus corresponding to the extracted apparatus name is extracted as a first number of processing waiting products from the number-of-processing-waiting-products control table shown in FIG. 2 by using, as a search key, the extracted apparatus name and operation halt time. If the time coincident with the extracted operation halt time is not present in any record of the number-of-processing-waiting-products control table, the number of processing waiting products in a record having a time antecedent and closest to the extracted operation halt time is extracted as the first number of processing waiting products.

In Step S12c, the number of processing waiting products at the extracted reoperation time of the manufacturing apparatus corresponding to the extracted apparatus name is extracted as a second number of processing waiting products from the number-of-processing-waiting-products control table shown in FIG. 2 by using, as a search key, the extracted apparatus name and reoperation time. If the time coincident with the extracted reoperation time is not present in any record of the number-of-processing-waiting-products control table, the number of processing waiting products in a record having a time posterior and closest to the extracted reoperation time is extracted as the second number of processing waiting products.

In Step S12d, a change in the number of processing waiting products during the operation halt period of the manufacturing apparatus is obtained by subtracting the first number of processing waiting products (the number of processing waiting products at the operation halt time of the manufacturing apparatus) obtained in Step S12b from the second number of processing waiting products (the number of processing waiting products at the reoperation time of the manufacturing apparatus) obtained in Step S12c.

Specifically, if the manufacturing apparatus under the apparatus name of "E-1" has its operation halted at "2000/5/2 18:23" and is reoperated at "2000/5/3 04:04" as shown in FIG. 3 (Apparatus-Halt-State Control Table), e.g., the number of processing waiting products (first number of processing waiting products) at the operation halt time ("2000/5/2 18:23") of the manufacturing apparatus under the apparatus name of "E-1" is "6" and the number of processing waiting products (second number of processing waiting products) at the reoperation time ("2000/5/3 04:04") of the manufacturing apparatus under the apparatus name of "E-1" is "15", as shown in FIG. 2 (Number-of-Processing-Waiting-Products Control Table). In this case, therefore, the change in the number of processing waiting products is "15−6=9".

Halt-Influence Evaluating Step (Step S13)

Next, in Step S13, the halt influence is evaluated based on the change in the number of processing waiting products obtained in Step S12, i.e., on the value obtained by subtracting the first number of processing waiting products from the second number of processing waiting products.

Figure 5:
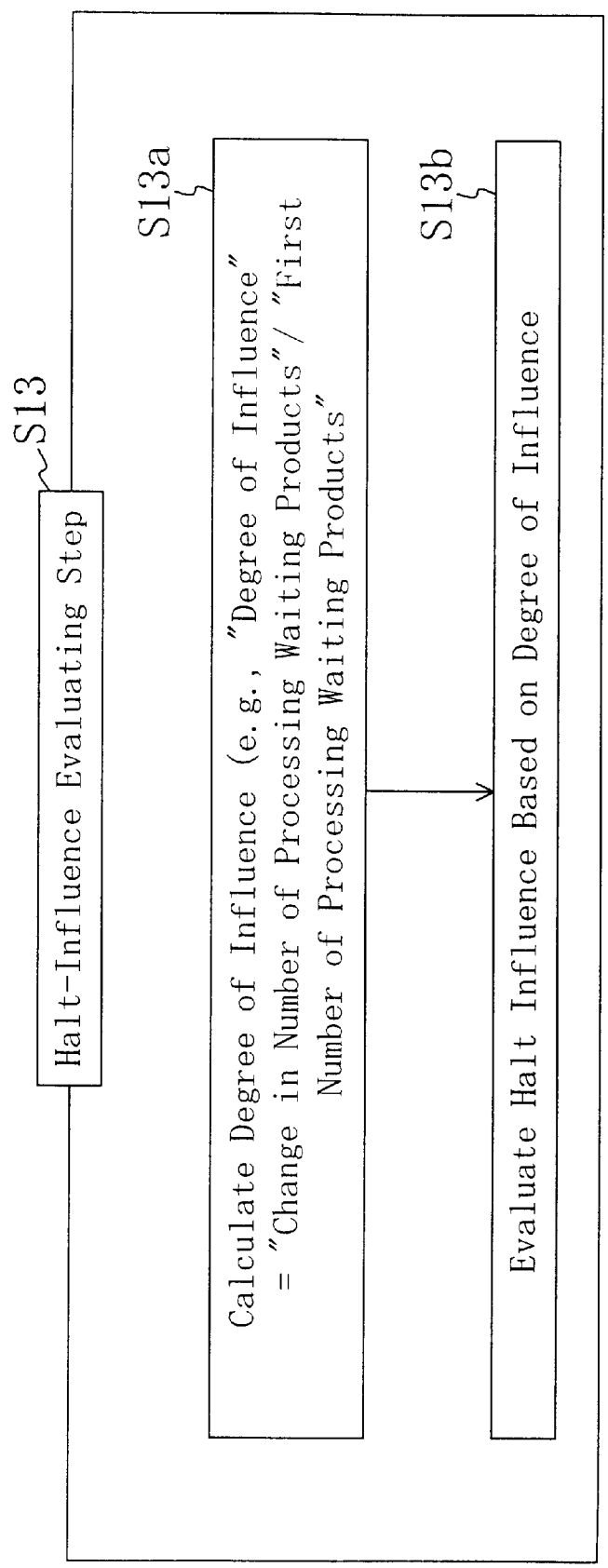
FIG. 5 is a flow chart illustrating the individual substeps of a halt-influence evaluating step in the method of monitoring manufacturing apparatus according to the first embodiment.

A specific description will be given to Step S13 with reference to FIG. 5.

In Step S13a, the degree of influence is calculated by, e.g., dividing the change in the number of processing waiting products obtained in Step S12 by the first number o f processing waiting products obtained in Step S12, which is given by the following equation:

Degree of Influence=Change in Number of Processing waiting Products/First Number of Processing waiting Products.

In Step S13b, the halt influence is evaluated based on the degree of influence calculated in Step S13a. At this time, if the degree of influence is less than 1.0, e.g., it is judged that "there is no halt influence". If the degree of influence is equal to or more than 1.0 and less than 2.0, it is judged that "there is slight halt influcence". If the degree of influence is equal to or more than 2.0 and less than 3.0, it is judged that "there is middle halt influence". If the degree of influence is equal to or more than 3.0, it is judged that "there is heavy halt influence". That is, the halt influence is judged to be greater as the change in the number of processing waiting products, i.e., the value obtained by subtracting the first number of processing waiting products from the second number of processing waiting products is larger and as the first number of processing waiting products is smaller.

Specifically, if the manufacturing apparatus under the apparatus name of "E-1" has its operation halt at "2000/5/2 18:23" and is reoperated at "2000/5/3 04:04", as shown in FIG. 3 (Apparatus-Halt-State Control Table), e.g., the first number of processing waiting products is "6", the second number of processing waiting products is "15", and the change in the number of processing waiting products is "9". In this case, therefore, the degree of influence is "9/6=1.5" so that it is judged that "there is slight halt influence".

Thus, the first embodiment evaluates the halt influence based on the difference between the first number of processing waiting products at the operation halt time of the manufacturing apparatus and the second number of processing waiting products at the reoperation time thereof. Since the halt influence can be evaluated by using the change in the number of processing waiting products during the operation halt period of the manufacturing apparatus, the halt influence can be evaluated in consideration of the busyness of the manufacturing apparatus during the operation halt period thereof. This allows precise evaluation of the halt influence even in a manufacturing line for electronic devices or the like in which busyness differs greatly from one manufacturing apparatus to another.

Since the first embodiment judges the halt influence to be greater as the value obtained by subtracting the first number of processing waiting products from the second number of processing waiting products is larger, the halt influence can be evaluated easily.

In the first embodiment, a method of registering data in the number-of-processing-waiting-products control table or the apparatus-halt-state control table, searching data therein, or extracting data therefrom is not particularly limited. Data may be registered, searched, or extracted by using a SQL or the like provided in a DBMS (database management system) or the like.

Although the number-of-processing-waiting-products control table or the apparatus-halt-state control table is present on the memory of the computer in the first embodiment, it may be present on a storage medium on a computer network that can be accessed by the computer.

Although the first embodiment has registered the number of processing waiting products at given time intervals in the number-of-processing-waiting-products control table in Step S11, it is also possible to register the number of processing waiting products at predetermined times.

In the first embodiment, the timing for registering the operation halt time or the reoperation time of the apparatus-halt-state control table in Step S11 is not particularly limited. It is also possible to register the operation halt time when the operation of the manufacturing apparatus is halted and register the reoperation time when the manufacturing apparatus is reoperated or register each of the operation halt time and the reoperation time when the manufacturing apparatus is reoperated.

Although the first embodiment has extracted, when the reoperation time is registered in the apparatus-halt-state control table, the registered reoperation time, the apparatus name and the operation halt time each corresponding to the registered reoperation time from the apparatus-halt-state control table in Step S12, it is also possible to extract the apparatus name, the operation halt time, and the reoperation time from the apparatus-halt-state control table at predetermined times or at given time intervals instead.

Although the first embodiment has obtained, as the first number of processing waiting products, the number of processing waiting products at the operation halt time of the manufacturing apparatus and obtained, as the second number of processing waiting products, the number of products at the reoperation time of the manufacturing apparatus in Step S12, it is also possible to obtain, as the first number of processing waiting products, the number of processing waiting products at a time slightly before the operation halt time of the manufacturing apparatus (about 1 to 60 minutes) and obtain, as the second number of processing waiting products, the number of processing waiting products at a time slightly after the reoperation time of the manufacturing apparatus (about 1 to 60 minutes) instead.

Although the first embodiment has subtracted the first number of processing waiting products from the second number of processing waiting products to obtain the change in the number of processing waiting products in Step S12, it is also possible to subtract the second number of processing waiting products from the first number of processing waiting products instead.

Although the first embodiment has calculated the degree of influence by dividing the change in the number of processing waiting products by the first number of processing waiting products and judged the halt influence to be greater as the calculated degree of influence is higher in Step S13, it is also possible to regard the change in the number of processing waiting products as the degree of influence and judge the halt influence to be greater as the degree of influence is higher.

Embodiment 2

Referring to the drawings, a method of monitoring manufacturing apparatus according to a second embodiment of the present invention will be described by using the exemplary case of evaluating, when the operation of any of a plurality of manufacturing apparatus used sequentially in an LSI manufacturing line to manufacture a plurality of products of different processing priorities or different types is halted, halt influence exerted by the operation halt on the manufacturing state of each of the products by monitoring the operating state of each of the manufacturing apparatus.

Figure 6:
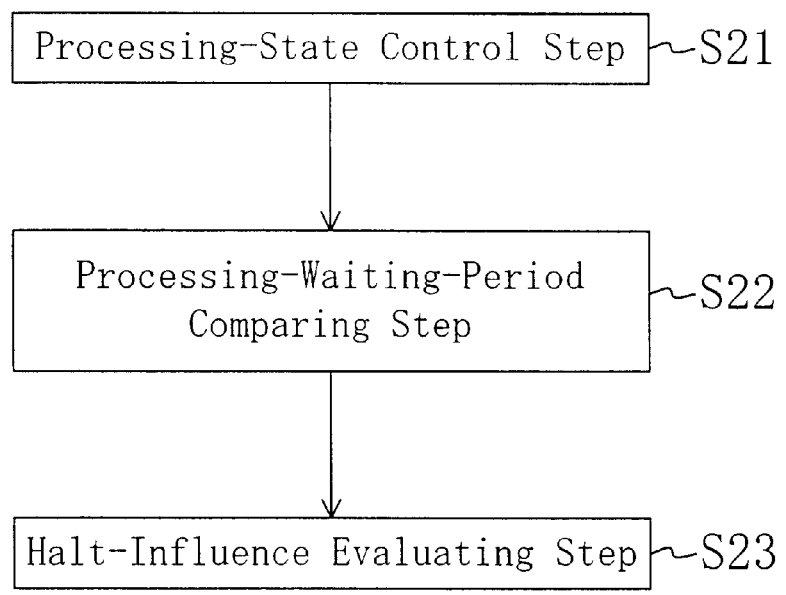
FIG. 6 is a flow chart of the method of monitoring manufacturing apparatus according to the second embodiment.

FIG. 6 is a flow chart of the method of monitoring manufacturing apparatus according to the second embodiment.

Processing-State Control Step (Step S21)

First, in Step S21, the period during which the product processed by each of the manufacturing apparatus is in the processing waiting state in each of the manufacturing apparatus (hereinafter referred to as a processing waiting period) and the operation halt state of each of the manufacturing apparatus are examined by monitoring the operating state of each of the manufacturing apparatus in the LSI manufacturing line.

Specifically, the processing time and processing waiting period of the product in each of the manufacturing apparatus are registered in a record of a product-processing control table on a computer memory device having, as items, at least an apparatus name, a processing time, and a processing waiting period, as shown in FIG. 7.

On the other hand, an operation halt time at which the operation of each of the manufacturing apparatus is halted due to trouble occurring therein, maintenance thereof, or the like and a reoperation time at which the manufacturing apparatus is reoperated after the operation thereof is halted are registered in a record of an apparatus-halt-state control table on a memory of a computer having, as items, at least an apparatus name, an operation halt time, and a reoperation time as shown in FIG. 3, similarly to Step S11 of the first embodiment.

Processing-Waiting-Period Comparing Step (Step S22)

Next, in Step S22, a change in processing waiting period is obtained by comparing the processing waiting periods before and after the operation halt period of the manufacturing apparatus.

Figure 8:
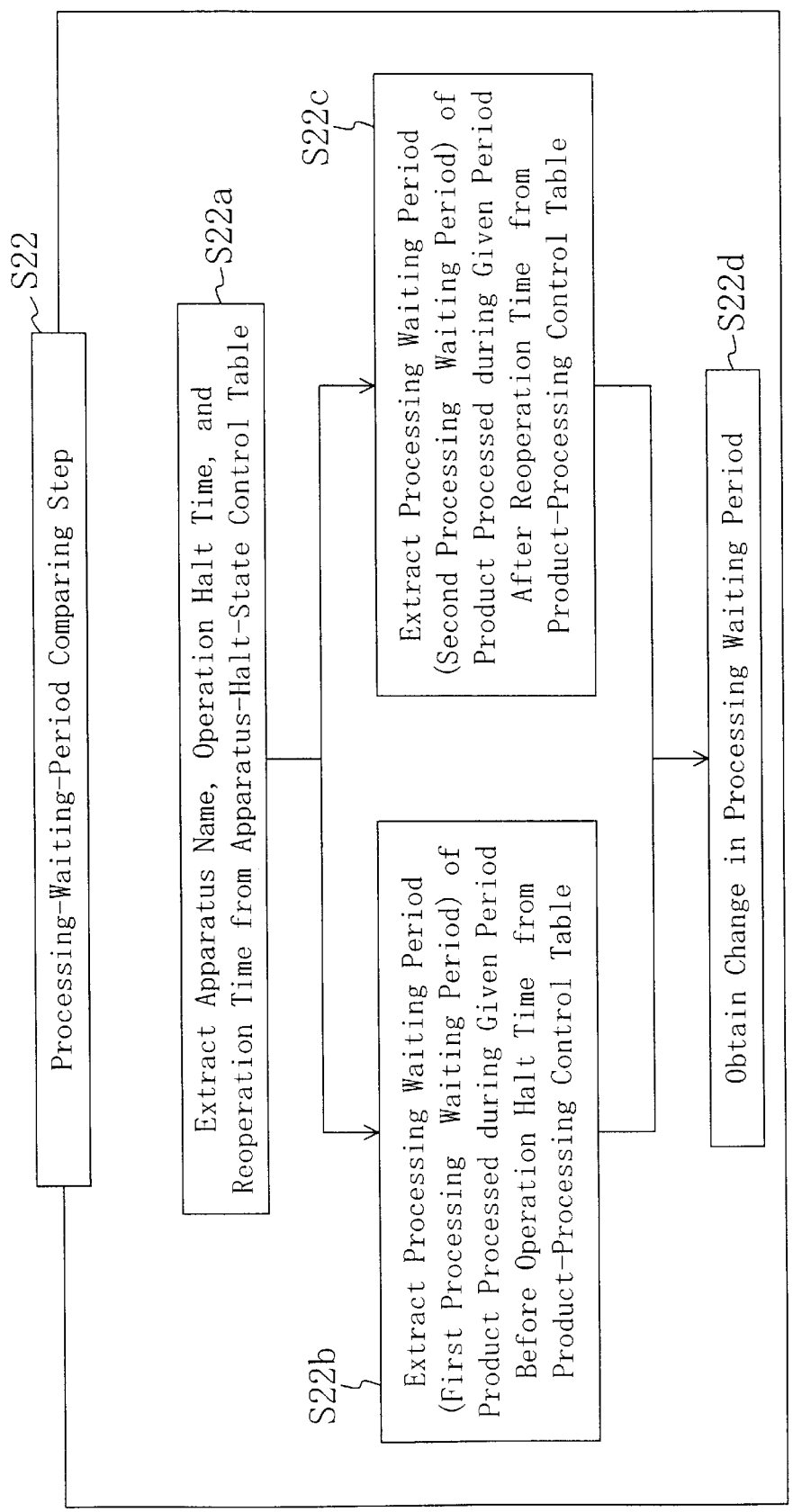
FIG. 8 is a flow chart illustrating the individual substeps of a processing-waiting-period comparing step in the method of monitoring manufacturing apparatus according to the second embodiment.

A specific description will be given to Step S22 with reference to FIG. 8.

In Step S22a, when the reoperation time is registered in the apparatus-halt-state control table shown in FIG. 3, the registered reoperation time, the apparatus name, and the operation halt time, each corresponding to the registered reoperation time, are extracted from the apparatus-halt-state control table.

In Step S22b, the processing waiting period at the extracted operation halt time of the manufacturing apparatus corresponding to the extracted apparatus name is extracted as a first processing waiting period from the product-processing control table shown in FIG. 7 by using, as a search key, the extracted apparatus name and operation halt time. Specifically, the processing waiting period of the product processed in the manufacturing apparatus corresponding to the extracted apparatus name during a given period immediately before the extracted operation halt time is extracted as the first processing waiting period. If the given period is, e.g., one hour, the processing waiting period in the record of the product-processing control table having the processing time between the time one hour before the extracted operation halt time and the operation time is extracted as the first processing waiting period. If there are a plurality of processing waiting periods extracted from the product-processing control table, a mean value of the plurality of processing waiting periods is calculated as the first processing waiting period. If there is no processing waiting period extracted from the product-processing control table, the first processing waiting period is assumed to be 0.

In Step S22c, the processing waiting period at the extracted reoperation time of the manufacturing apparatus corresponding to the extracted apparatus name is extracted as a second processing waiting period from the product-processing control table shown in FIG. 7 by using, as a search key, the extracted apparatus name and reoperation time. Specifically, the processing waiting period of the product processed in the manufacturing apparatus corresponding to the extracted apparatus name during a given period immediately after the extracted reoperation time is extracted as the second processing waiting period. If the given period is, e.g., one hour, the processing waiting period in the record of the product-processing control table having the processing time between the extracted reoperation time and the time one hour after the extracted reoperation time is extracted as the second processing waiting period. If there are a plurality of processing waiting periods extracted from the product-processing control table, a mean value of the plurality of processing waiting periods is calculated as the second processing waiting period. If there is no processing waiting period extracted from the product-processing control table, the second processing waiting period is assumed to be 0.

In Step S22d, a change in processing waiting period during the operation halt period of the manufacturing apparatus is obtained by subtracting the first processing waiting period (the processing waiting period at the operation halt time of the manufacturing apparatus) obtained in Step S22b from the second processing waiting period (processing waiting period at the reoperation time of the manufacturing apparatus) obtained in Step S22c.

Specifically, if the manufacturing apparatus under the apparatus name of "E-1" has its operation halted at "2000/5/2 18:23" and is reoperated at "2000/5/3 04:04" as shown in FIG. 3 (Apparatus-Halt-State Control Table), e.g., a mean value (first processing waiting period) of the processing waiting periods of products processed by the manufacturing apparatus under the apparatus name of "E-1", between the time one hour before the operation halt time ("2000/5/2 18:23") and the operation halt time (a product processed at the processing time of "2000/5/2 17:42" and a product processed at the processing time of "2000/5/2 18:22") is "(43 minutes+29 minutes)/2=36 minutes", as shown in FIG. 7 (Product-Processing Control Table). On the other hand, a mean value (second processing waiting period) of the processing waiting periods of products processed by the manufacturing apparatus under the apparatus name of "E-1" between the reoperation time ("2000/5/3 04:04") and the time one hour after the reoperation time (a product processed at the processing time of "2000/5/3 04:05" and a product processed at the processing time of "2000/5/3 04:47") is "(659 minutes+643 minutes)/2=651 minutes". In this case, therefore, the change in processing waiting period is "651 minutes−36 minutes=615 minutes".

Halt Influence Evaluating Step (Step S23)

Next, in Step S23, the halt influence is evaluated based on the change in processing waiting period obtained in Step S22, i.e., on the value obtained by subtracting the first processing waiting period from the second processing waiting period.

Figure 9:
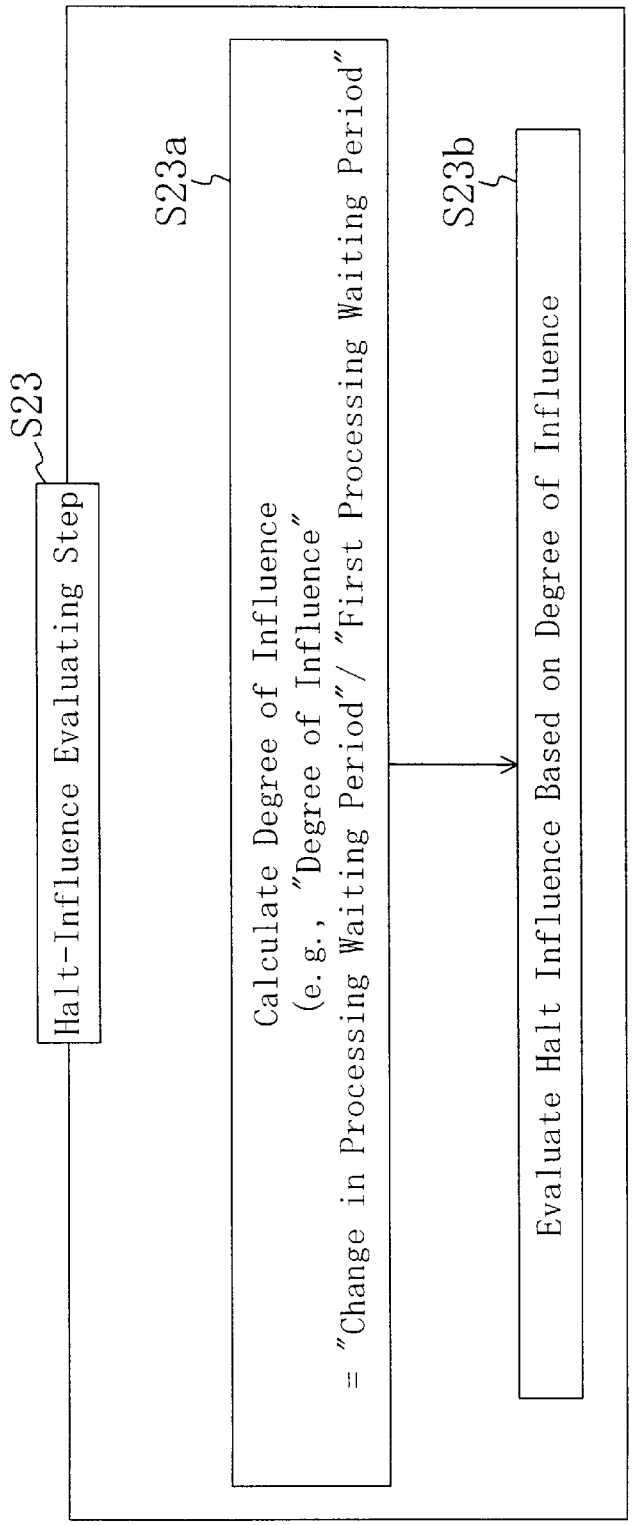
FIG. 9 is a flow chart illustrating the individual substeps of a halt-influence evaluating step in the method of monitoring manufacturing apparatus according to the second embodiment.

A specific description will be given to Step S23 with reference to FIG. 9.

In Step S23a, the degree of influence is calculated by, e.g., dividing the change in processing waiting period obtained in Step S22 by the first processing waiting period obtained in Step S22, which is given by the following equation:

Degree of Influence=Change in Processing Waiting Period/First Processing waiting Period.

In Step S23b, the halt influence is evaluated based on the degree of influence calculated in Step S23a. At this time, if the degree of influence is less than 1.0, e.g., it is judged that "there is no halt influence". If the degree of influence is equal to or more than 1.0 and less than 10, it is judged that "there is slight halt influcence". If the degree of influence is equal to or more than 10 and less than 20, it is judged that there is middle halt influence". If the degree of influence is equal to or more than 30, it is judged that "there is heavy halt influence". That is, the halt influence is judged to be greater as the change in processing waiting period, i.e., the value obtained by subtracting the first processing waiting period from the second processing waiting period is larger and as the first processing waiting period is shorter.

Specifically, if the manufacturing apparatus under the apparatus name of "E-1" has its operation halted at "2000/5/2 18:23" and is reoperated at "2000/5/3 04:04" as shown in FIG. 3 (Apparatus-Halt-State Control Table), e.g., the first processing waiting period is "36 minutes", the second processing waiting period is "651 minutes", and the change in the processing waiting period is "615 minutes", as stated previously. Accordingly, the degree of influence is "615/36≈17.1", so that it is judged that "there is middle halt influence".

Thus, the second embodiment evaluates the halt influence based on the difference between the first processing waiting period at the operation halt time of the manufacturing apparatus and the second processing waiting period at the reoperation time thereof. Since the halt influence can be evaluated by using the change in processing waiting period during the operation halt period of the manufacturing apparatus, the halt influence can be evaluated in consideration of the busyness of the manufacturing apparatus during the operation halt period thereof. This allows precise evaluation of the halt influence even in a manufacturing line for electronic devices or the like in which busyness differs greatly from one manufacturing apparatus to another.

Since the second embodiment judges the halt influence to be greater as the value obtained by subtracting the first processing waiting period from the second processing waiting period is larger, the halt influence can be evaluated easily.

In the second embodiment, a method of registering data in the product-processing control table or the apparatus-halt-state control table, searching data therein, or extracting data therefrom is not particularly limited. Data may be registered, searched, or extracted by using a SQL or the like provided in a DBMS or the like.

Although the product-processing control table or the apparatus-halt-state control table is present on the memory of the computer in the second embodiment, it may be present on a storage medium on a computer network that can be accessed by the computer.

In the second embodiment, the timing for registering the processing time and the processing waiting period in the product-processing control table in Step S21 is not particularly limited in the second embodiment. It is also possible to register the processing time and the processing waiting period at the initiation or completion of product processing performed by the manufacturing apparatus.

In the second embodiment, the timing for registering the operation halt time or the reoperation time of the apparatus-halt-state control table in Step S21 is not particularly limited. It is also possible to register the operation halt time when the operation of the manufacturing apparatus is halted and register the reoperation time when the manufacturing apparatus is reoperated or register each of the operation halt time and the reoperation time when the manufacturing apparatus is reoperated.

Although the second embodiment has extracted, when the reoperation time is registered in the apparatus-halt-state control table, the registered reoperation time, the apparatus name, and the operation halt time each corresponding to the registered reoperation time from the apparatus-halt-state control table in Step S22, it is also possible to extract the apparatus name, the operation halt time, and the reoperation time from the apparatus-halt-state control table at predetermined times or at given time intervals instead.

Although the second embodiment has obtained, as the first processing waiting period, the processing waiting period of the product processed during the given period immediately before the operation halt time of the manufacturing apparatus and obtained, as the second processing waiting period, the processing waiting period of the product processed during the given period immediately after the reoperation time of the manufacturing apparatus in Step S22, it is also possible to obtain, as the first processing waiting period, the processing waiting period of the product processed during the given period immediately before a time slightly before the operation halt time of the manufacturing apparatus (about 1 to 60 minutes) and obtain, as the second processing waiting period, the processing waiting period of the product processed during the given period immediately after the time slightly after the reoperation time of the manufacturing apparatus (about 1 to 60 minutes) instead.

In the second embodiment, the given period used in Step S22 is not particularly limited. The given period may also be determined based on the time required for product processing performed by the manufacturing apparatus. This allows the processing waiting period to be obtained in accordance with the time required for product processing performed by the manufacturing apparatus. In this case, the given period is preferably determined to be longer as the time required for product processing performed by the manufacturing apparatus is longer. This ensures the obtention of the processing waiting period.

Although the second embodiment has subtracted the first processing waiting period from the second processing waiting period to obtain the change in processing waiting period in Step S22, it is also possible to subtract the second processing waiting period from the first processing waiting period instead.

Although the second embodiment has calculated the degree of influence by dividing the change in processing waiting period by the first processing waiting period in Step S23 and judged the halt influence to be greater as the calculated degree of influence is higher, it is also possible to regard the change in processing waiting period as the degree of influence and judge the halt influence to be greater as the degree of influence is higher.

Embodiment 3

Referring to the drawings, a method of monitoring manufacturing apparatus according to a third embodiment of the present invention will be described by using the exemplary case of evaluating, when the operation of any of a plurality of manufacturing apparatus used sequentially in an LSI manufacturing line to manufacture a plurality of products of different processing priorities or different types is halted, halt influence exerted by the operation halt on the manufacturing state of each of the products by monitoring the operating state of each of the manufacturing apparatus.

Figure 10:
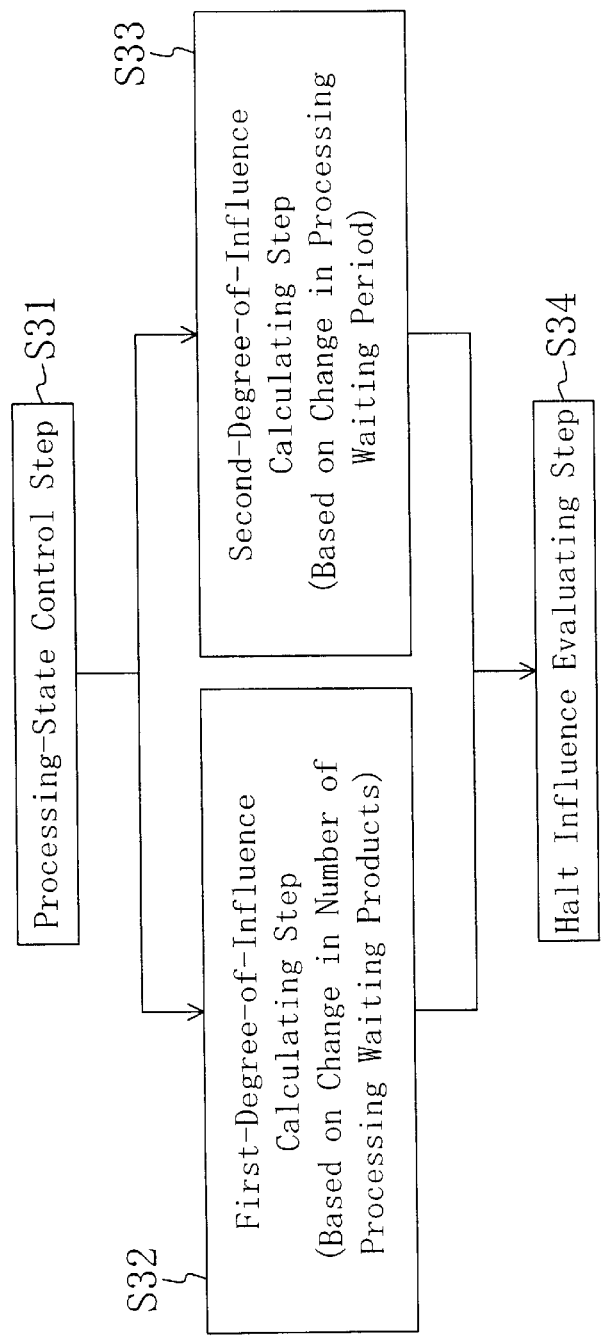
FIG. 10 is a flow chart of a method of monitoring manufacturing apparatus according to the third embodiment.

FIG. 10 is a flow chart of the method of monitoring manufacturing apparatus according to the third embodiment.

Processing-State Control Step (Step S31)

First, in Step S31, the number of processing waiting products in the processing waiting state in each of the manufacturing apparatus in an LSI manufacturing line, the processing waiting period during which the product processed by each of the manufacturing apparatus is in the processing waiting state in each of the manufacturing apparatus, and the operation halt state of each of the manufacturing apparatus are examined by monitoring the operating state of each of the manufacturing apparatus in the LSI manufacturing line.

Specifically, the number of processing waiting products in each of the manufacturing apparatus is registered at given time intervals of, e.g., one minute in a record of a number-of-processing-waiting-products control table on a computer memory having, as items, at least an apparatus name, a time, and the number of processing waiting products as shown in FIG. 2, similarly to Step S11 of the first embodiment.

The processing time and processing waiting period of the product in each of the manufacturing apparatus are registered in a record of a product-processing control table on a computer memory having, as items, at least an apparatus name, a processing time, and a processing waiting period as shown in FIG. 7, similarly to Step S21 of the second embodiment.

An operation halt time at which the operation of each of the manufacturing apparatus is halted due to trouble occurring therein, maintenance thereof, or the like and a reoperation time at which the manufacturing apparatus is reoperated after the operation thereof is halted are registered in a record of an apparatus-halt-state control table on a memory of a computer having, as items, at least an apparatus name, an operation halt time, and a reoperation time as shown in FIG. 3, similarly to Step S11 of the first embodiment or Step S21 of the second embodiment.

First-Degree-of-Influence Calculating Step (Step S32)

Next, in Step S32, a first degree of influence is calculated based on a change in the number of processing waiting products during the operation halt period of the manufacturing apparatus.

Figure 11:
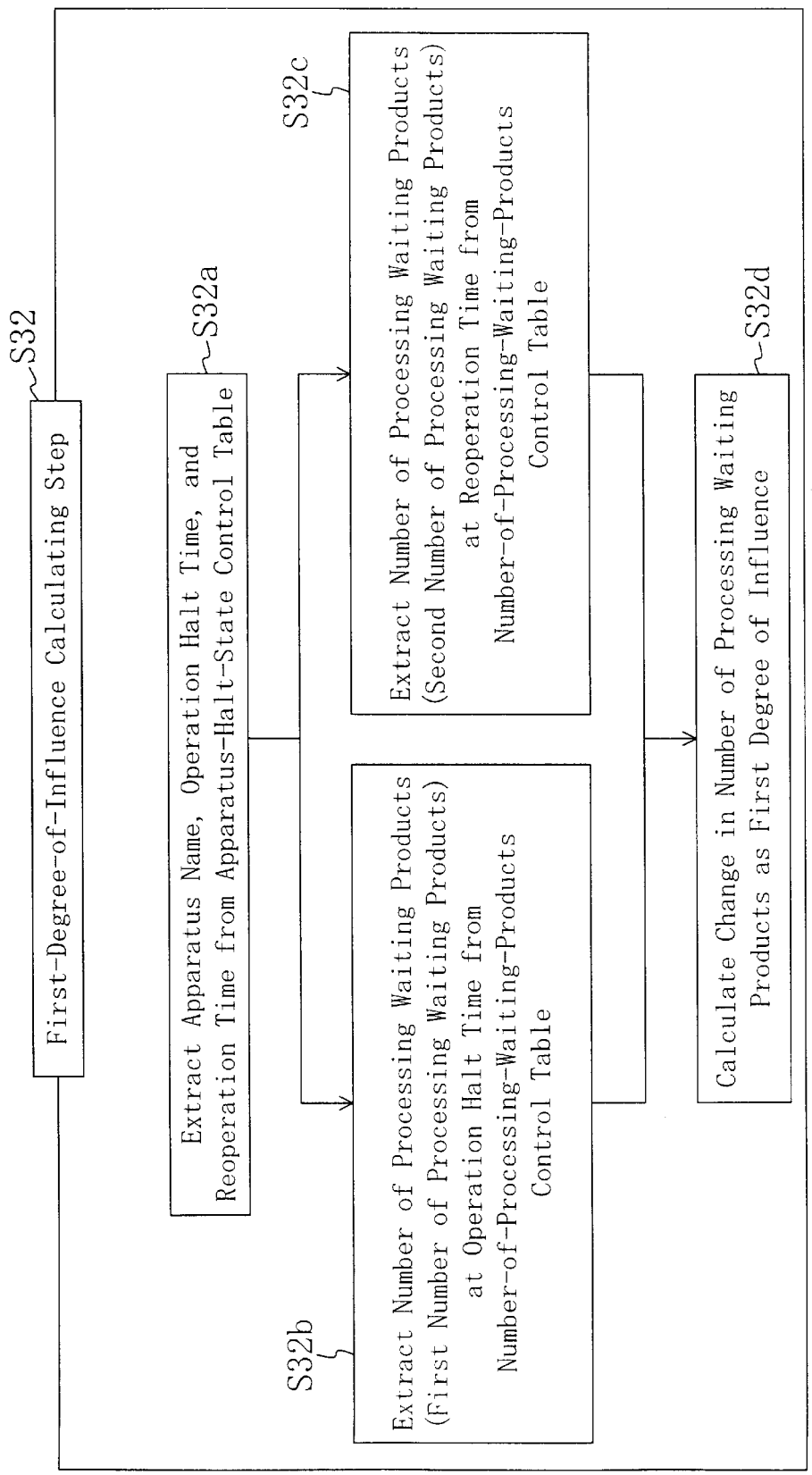
FIG. 11 is a flow chart illustrating the individual substeps of a first-degree-of-influence calculating step in the method of monitoring manufacturing apparatus according to the third embodiment.

A specific description will be given to Step S32 with reference to FIG. 11.

In Step S32a, when the reoperation time is registered in the apparatus-halt-state control table shown in FIG. 3, the registered reoperation time, the apparatus name, and the operation halt time, each corresponding to the registered reoperation time, are extracted from the apparatus-halt-state control table, similarly to Step S12a of the first embodiment.

In Step S32b, the number of processing waiting products at the extracted operation halt time of the manufacturing apparatus corresponding to the extracted apparatus name is extracted as a first number of processing waiting products from the number-of-processing-waiting-products control table shown in FIG. 2 by using, as a search key, the extracted apparatus name and operation halt time, similarly to Step S12b of the first embodiment. If the time coincident with the extracted operation halt time is not present in any record of the number-of-processing-waiting-products control table, the number of processing waiting products in a record having a time antecedent and closest to the extracted operation halt time is extracted as the first number of processing waiting products, similarly to Step S12b of the first embodiment.

In Step S32c, the number of processing waiting products at the extracted reoperation time of the manufacturing apparatus corresponding to the extracted apparatus name is extracted as a second number of processing waiting products from the number-of-processing-waiting-products control table shown in FIG. 2 by using, as a search key, the extracted apparatus name and reoperation time, similarly to Step S12c of the first embodiment. If the time coincident with the extracted reoperation time is not present in any record of the number-of-processing-waiting-products control table, the number of processing waiting products in a record having a time posterior and closest to the extracted reoperation time is extracted as the second number of processing waiting products, similarly to Step S12c of the first embodiment.

In Step S32d, the first degree of influence is calculated based on the change in the number of processing waiting products during the operation halt period of the manufacturing apparatus, which is obtained as a result of subtracting the first number of processing waiting products (the number of processing waiting products at the operation halt time of the manufacturing apparatus) obtained in Step S32b from the second number of processing waiting products (the number of processing waiting products at the reoperation time of the manufacturing apparatus) obtained in Step S32c.

A method of calculating the first degree of influence is not particularly limited. For example, the change in the number of processing waiting products may be calculated as the first degree of influence without any alterations or, alternatively, the result of multiplying the change in the number of processing waiting products by a given coefficient may also be calculated as the first degree of influence.

Specifically, if the manufacturing apparatus under the apparatus name of "E-1" has its operation halted at "2000/5/2 18:23" and is reoperated at "2000/5/3 04:04" as shown in FIG. 3 (Apparatus-Halt-State Control Table), e.g., the number of processing waiting products (first number of processing waiting products) at the operation halt time ("2000/5/2 18:23") of the manufacturing apparatus under the apparatus name of "E-1" is "6" and the number of processing waiting products (second number of processing waiting products) at the reoperation time ("2000/5/3 04:04") of the manufacturing apparatus under the apparatus name of "E-1" is "15", as shown in FIG. 2 (Number-of-Processing-Waiting-Products Control Table). In this case, therefore, the change in the number of processing waiting products is "15−6=9" so that the first degree of influence becomes "9" when the change in the number of processing waiting products is calculated as the first degree of influence without any alterations.

Second-Degree-of-Influence Calculating Step (Step S33)

Next, in Step S33, a second degree of influence is calculated based on a change in processing waiting period during the operation halt period of the manufacturing apparatus.

Figure 12:
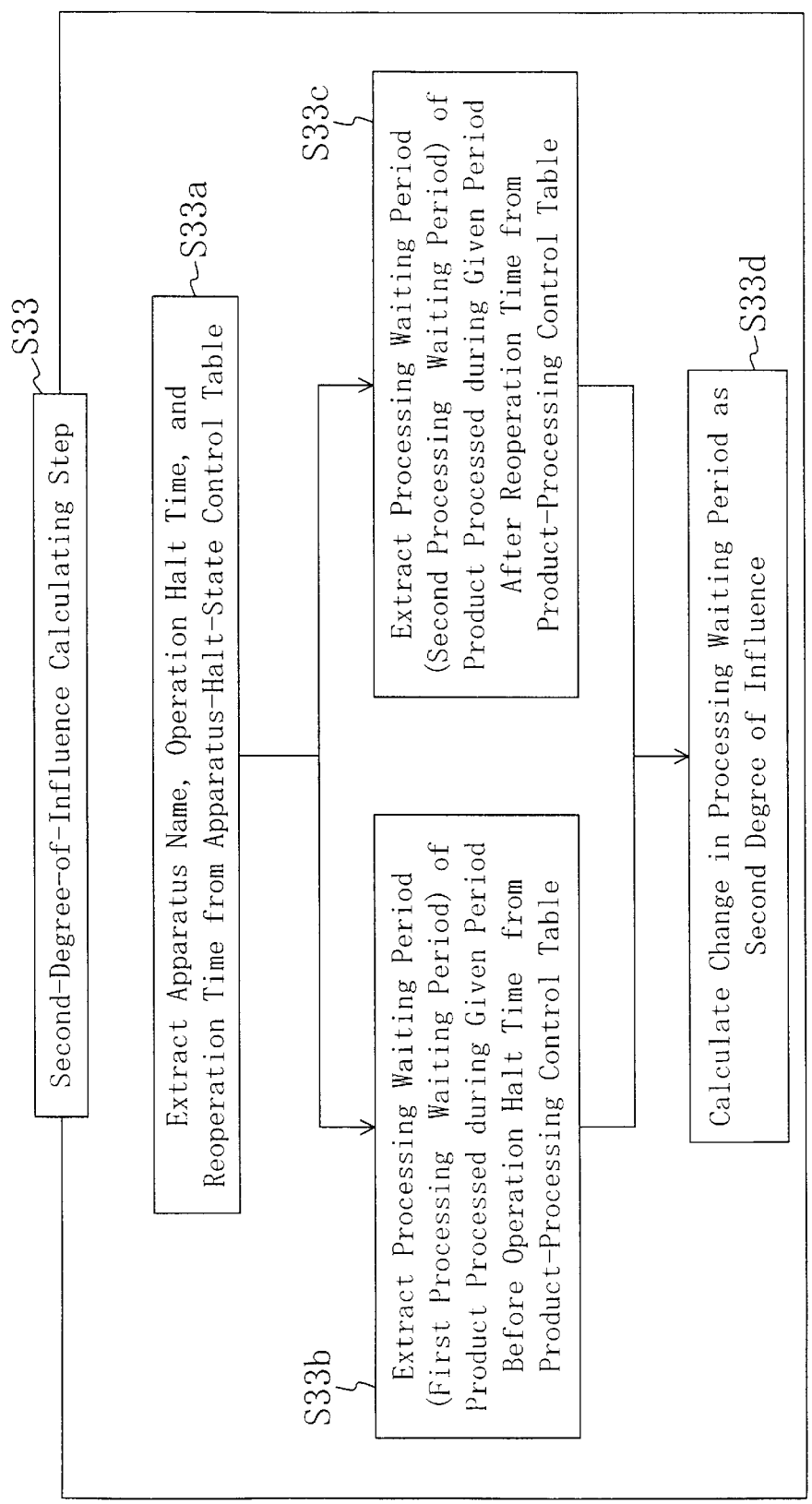
FIG. 12 is a flow chart illustrating the individual substeps of a second-degree-of-influence calculating step in the method of monitoring manufacturing apparatus according to the third embodiment.

A specific description will be given to Step S33 with reference to FIG. 12.

In Step S33a, when the reoperation time is registered in the apparatus-halt-state control table shown in FIG. 3, the registered reoperation time, the apparatus name, and the operation halt time, each corresponding to the registered reoperation time, are extracted from the apparatus-halt-state control table, similarly to Step S22a of the second embodiment.

In Step S33b, the processing waiting period at the extracted operation halt time of the manufacturing apparatus corresponding to the extracted apparatus name is extracted as a first processing waiting period from the product-processing control table shown in FIG. 7 by using, as a search key, the extracted apparatus name and operation halt time, similarly to Step S22b of the second embodiment. Specifically, the processing waiting period of the product processed in the manufacturing apparatus corresponding to the extracted apparatus name during a given period immediately before the extracted operation halt time is extracted as the first processing waiting period. If the given period is, e.g., one hour, the processing waiting period in the record of the product-processing control table having the processing time between the time one hour before the extracted operation halt time and the operation time is extracted as the first processing waiting period. If there are a plurality of processing waiting periods extracted from the product-processing control table, a mean value of the plurality of processing waiting periods is calculated as the first processing waiting period. If there is no processing waiting period extracted from the product-processing control table, the first processing waiting period is assumed to be 0, similarly to Step S22b of the second embodiment.

In Step S33c, the processing waiting period at the extracted reoperation time of the manufacturing apparatus corresponding to the extracted apparatus name is extracted as a second processing waiting period from the product-processing control table shown in FIG. 7 by using, as a search key, the extracted apparatus name and reoperation time, similarly to Step S22c of the second embodiment. Specifically, the processing waiting period of the product processed in the manufacturing apparatus corresponding to the extracted apparatus name during a given period immediately after the extracted reoperation time is extracted as the second processing waiting period. If the given period is, e.g., one hour, the processing waiting period in the record of the product-processing control table having the processing time between the extracted reoperation time and the time one hour after the extracted reoperation time is extracted as the second processing waiting period. If there are a plurality of processing waiting periods extracted from the product-processing control table, a mean value of the plurality of processing waiting periods is calculated as the second processing waiting period. If there is no processing waiting period extracted from the product-processing control table, the second processing waiting period is assumed to be 0.

In Step S33d, the second degree of influence is calculated based on the change in processing waiting period during the operation halt period of the manufacturing apparatus, which is obtained as a result of subtracting the first processing waiting period (the processing waiting period at the operation halt time of the manufacturing apparatus) obtained in Step S33b from the second processing waiting period (processing waiting period at the reoperation time of the manufacturing apparatus) obtained in Step S33c.

A method of calculating the second degree of influence is not particularly limited. For example, the change in processing waiting period may be calculated as the second degree of influence without any alterations or, alternatively, the result of multiplying the change in processing waiting period by a given coefficient may also be calculated as the second degree of influence.

Specifically, if the manufacturing apparatus under the apparatus name of "E-1" has its operation halted at "2000/5/2 18:23" and is reoperated at "2000/5/3 04:04" as shown in FIG. 3 (Apparatus-Halt-State Control Table), e.g., a mean value (first processing waiting period) of the processing waiting periods of products processed by the manufacturing apparatus under the apparatus name of "E-1" between the time one hour before the operation halt time ("2000/5/2 18:23") and the operation halt time (a product processed at the processing time of "2000/5/2 17:42" and a product processed at the processing time of "2000/5/2 18:22") is "(43 minutes+29 minutes)/2=36 minutes", as shown in FIG. 7 (Product-Processing Control Table). On the other hand, a mean value (second processing waiting period) of the processing waiting periods of products processed by the manufacturing apparatus under the apparatus name of "E-1" between the reoperation time ("2000/5/3 04:04") and the time one hour after the reoperation time (a product processed at the processing time of "2000/5/3 04:05" and a product processed at the processing time of "2000/5/3 04:47") is "(659 minutes+643 minutes)/2=651 minutes". In this case, therefore, the change in processing waiting period is "651 minutes−36 minutes=615 minutes" so that the second degree of influence becomes "615" when the change in processing waiting period is calculated as the second degree of influence without any alterations.

Halt Influence Evaluating Step (S34)

Next, in Step S34, the halt influence is evaluated based on the first degree of influence (change in the number of processing waiting products) obtained in Step S32 and on the second degree of influence (change in processing waiting period) obtained in Step S33.

Figure 13:
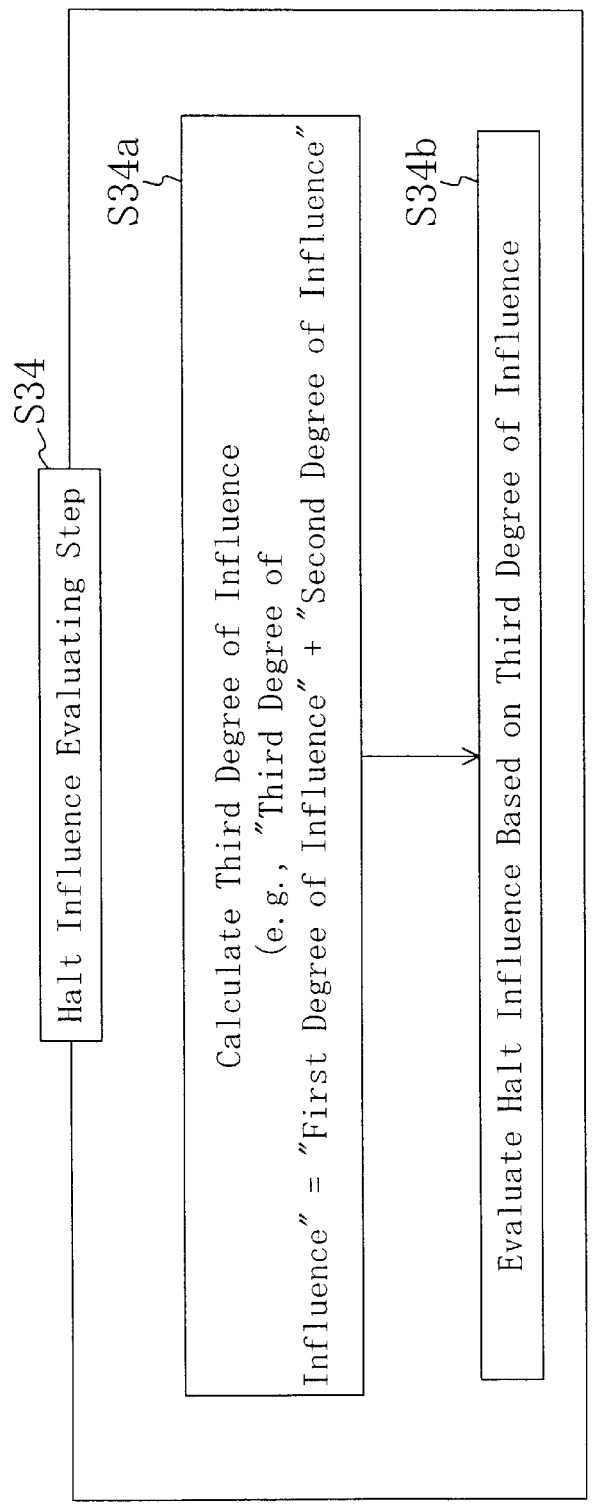
FIG. 13 is a flow chart illustrating the individual substeps of a halt-influence evaluating step according to the third embodiment.

A specific description will be given to Step S34 with reference to FIG. 13.

In Step S34a, the sum of the first degree of influence obtained in Step S32 and the second degree of influence obtained in Step S33, e.g., is calculated as a third degree of influence, which is given by the following equation:

"Third Degree of Influence"="First Degree of Influence"+"Second Degree of Influence".

In Step S34b, the halt influence is evaluated based on the third degree of influence calculated in Step S34a. The halt influence is judged to be greater as the degree of the third degree of influence is higher.

Specifically, if the manufacturing apparatus under the apparatus name of "E-1" has its operation halted at "2000/5/2 18:23" and is reoperated at "2000/5/3 04:04" as shown in FIG. 3 (Apparatus-Halt-State Control Table), e.g., the first degree of influence is "9" and the second degree of influence is "615", as stated previously. In this case, therefore, the third degree of influence becomes "9+615=624".

Thus, the third embodiment calculates the first degree of influence based on the value obtained by subtracting the first number of processing waiting products at the operation halt time of the manufacturing apparatus from the second number of processing waiting products at the reoperation time thereof, calculates the second degree of influence based on the value obtained by subtracting the first processing waiting period at the operation halt time of the manufacturing apparatus from the second processing waiting period at the reoperation time thereof, and evaluates the halt influence based on the first and second degrees of influence. Since the halt influence can be evaluated by using the change in the number of processing waiting products and the change in processing waiting period during the operation halt period of the manufacturing apparatus, the halt influence can be evaluated in consideration of the busyness of the manufacturing apparatus during the operation halt period thereof. This allows precise evaluation of the halt influence even in a manufacturing line for electronic devices or the like in which busyness differs greatly from one manufacturing apparatus to another. This also allows more precise evaluation of the halt influence than in the case where the halt influence is evaluated by using either one of the change in the number of processing waiting products and the change in the processing waiting period during the operation halt period of the manufacturing apparatus.

In the third embodiment, a method of registering data in the number-of-processing-waiting-products control table, the product-processing control table, or the apparatus-halt-state control table, searching data therein, or extracting data therefrom is not particularly limited. Data may be registered, searched, or extracted by using a SQL or the like provided in a DBMS or the like.

Although the number-of-processing-waiting-products control table, the product-processing control table, or the apparatus-halt-state control table is present on the memory of the computer in the third embodiment, it may be present on a storage medium on a computer network that can be accessed by the computer.

Although the third embodiment has registered the number of processing waiting products at given time intervals in the number-of-processing-waiting-products control table in Step S31, it is also possible to register the number of processing waiting products at predetermined times.

In the third embodiment, the timing for registering the processing time and the processing waiting period in the product-processing control table in Step S31 is not particularly limited. It is also possible to register the processing time and the processing waiting period at the initiation or completion of product processing performed by the manufacturing apparatus.

In the third embodiment, the timing for registering the operation halt time or the reoperation time of the apparatus-halt-state control table in Step S31 is not particularly limited in the third embodiment. It is also possible to register the operation halt time when the operation of the manufacturing apparatus is halted and register the reoperation time when the manufacturing apparatus is reoperated or register each of the operation halt time and the reoperation time when the manufacturing apparatus is reoperated.

Although the third embodiment has extracted, when the reoperation time is registered in the apparatus-halt-state control table, the registered reoperation time, the apparatus name and the operation halt time each corresponding to the registered reoperation time from the apparatus-halt-state control table in Step S32 or S33, it is also possible to extract the apparatus name, the operation halt time, and the reoperation time from the apparatus-halt-state control table at predetermined times or at given time intervals instead.

Although the third embodiment has obtained, as the first number of processing waiting products, the number of processing waiting products at the operation halt time of the manufacturing apparatus and obtained, as the second number of processing waiting products, the number of products at the reoperation time of the manufacturing apparatus in Step S32, it is also possible to obtain, as the first number of processing waiting products, the number of processing waiting products at a time slightly before the operation halt time of the manufacturing apparatus (about 1 to 60 minutes) and obtain, as the second number of processing waiting products, the number of processing waiting products at a time slightly after the reoperation time of the manufacturing apparatus (about 1 to 60 minutes) instead.

Although the third embodiment has obtained, as the first processing waiting period, the processing waiting period of the product processed during the given period immediately before the operation halt time of the manufacturing apparatus and obtained, as the second processing waiting period, the processing waiting period of the product processed during the given period immediately after the reoperation time of the manufacturing apparatus in Step S33, it is also possible to obtain, as the first processing waiting period, the processing waiting period of the product processed during the given period immediately before a time slightly before the operation halt time of the manufacturing apparatus (about 1 to 60 minutes) and obtain, as the second processing waiting period, the processing waiting period of the product processed during the given period immediately after the time slightly after the reoperation time of the manufacturing apparatus (about 1 to 60 minutes) instead.

In the third embodiment, the given period used in Step S33 is not particularly limited. The given period may also be determined based on the time required for product processing performed by the manufacturing apparatus. This allows the processing waiting period to be calculated in accordance with the time required for product processing performed by the manufacturing apparatus. In this case, the given period is preferably determined to be longer as the time required for product processing performed by the manufacturing apparatus is longer. This ensures the obtention of the processing waiting period.

Although the third embodiment has calculated, as the third degree of influence, the sum of the first and second degrees of influence in Step S34 and judged the halt influence to be greater as the third degree of influence calculated is higher, it is also possible to provide at least one of the first and second degrees of influence with a weight, calculate the sum of the first and second degrees of influence with the weight as the third degree of influence, and judge the halt influence to be greater as the third degree of influence calculated is higher. If each of the first and second degrees of influence is provided with a weight, "Third Degree of Influence"="First Degree of Influence with Weight"+"Second Degree of Influence with Weight"

"First Degree of Influence with Weight"="First Degree of Influence"×"Coefficient α"

"Second Degree of Influence with Weight"="Second Degree of Influence"×"Coefficient β"

are satisfied. Here, the coefficients α and β are determined based on a characteristic of the manufacturing apparatus (the number of products that can be processed simultaneously, the time required for one round of product processing, the time required for the activation of the apparatus, or the like) or on a characteristic of the manufacturing line (the number of manufacturing apparatus (in total), the number of products processed simultaneously, the number of manufacturing apparatus of the same type, or the like). This allows evaluation of the halt influence in accordance with the characteristic of each of the manufacturing apparatus in a manufacturing line composed of a plurality of manufacturing apparatus of entirely different types, properties, performances, or the like. In this case, the second degree of influence is preferably provided with a larger weight by increasing the value of the coefficient β as the time required for product processing performed by the manufacturing apparatus is longer. This allows more precise evaluation of the halt influence.

Embodiment 4

Referring to the drawings, a method of monitoring manufacturing apparatus according to a fourth embodiment of the present invention will be described by using the exemplary case of evaluating, when the operation of any of a plurality of manufacturing apparatus used sequentially in an LSI manufacturing line to manufacture a plurality of products of different processing priorities or different types is halted, halt influence exerted by the operation halt on the manufacturing state of each of the products by monitoring the operating state of each of the manufacturing apparatus. The processing priorities indicate the priorities with which product processing is performed by the manufacturing apparatus.

Figure 14:
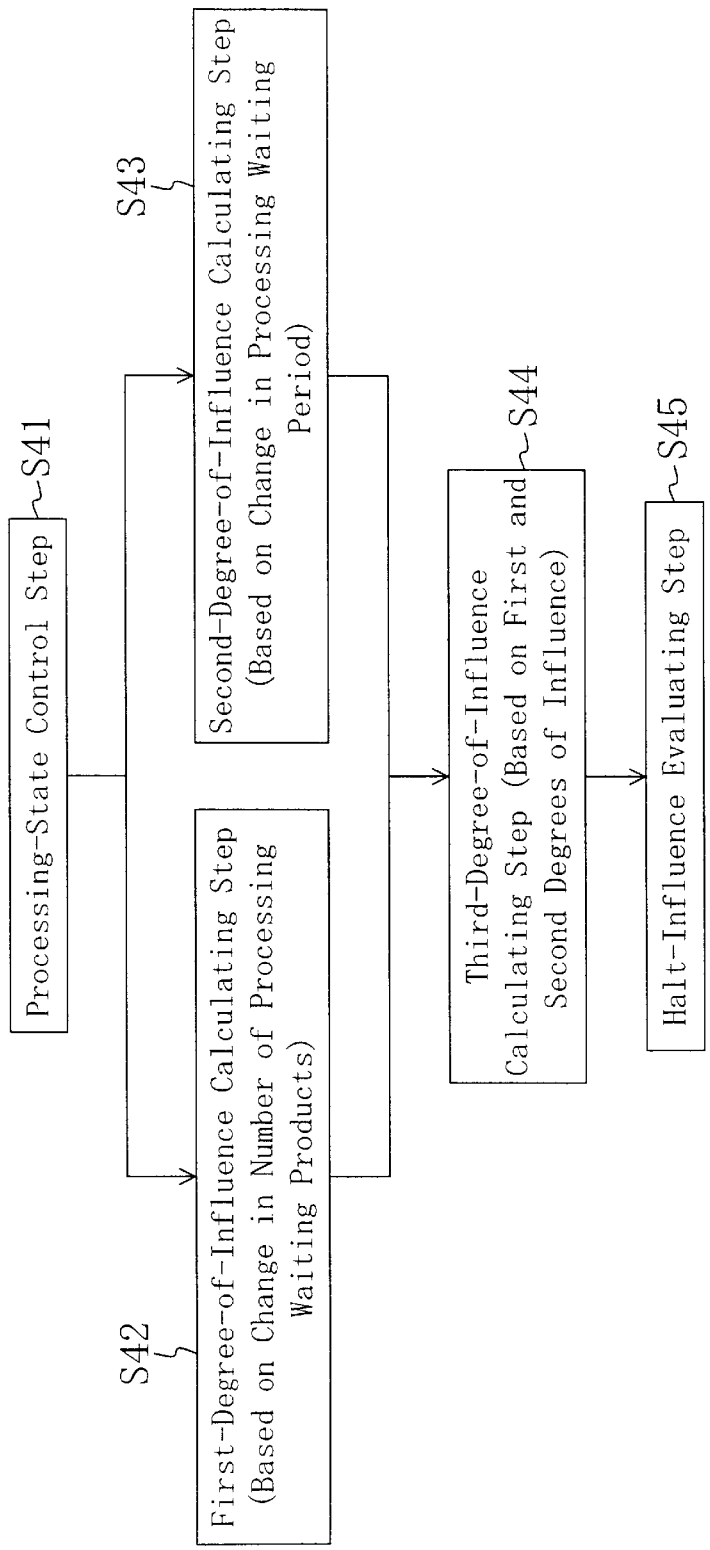
FIG. 14 is a flow chart of the method of monitoring manufacturing apparatus according to the fourth embodiment.

FIG. 14 is a flow chart of the method of monitoring the manufacturing apparatus according to the fourth embodiment.

Processing-State Control Step (Step S41)

First, in Step S41, the number of processing waiting products in the processing waiting state in each of the manufacturing apparatus in an LSI manufacturing line, the processing waiting period during which the product processed by the manufacturing apparatus is in the processing waiting state in each of the manufacturing apparatus, and the operation halt state of each of the manufacturing apparatus are examined by monitoring the operating state of each of the manufacturing apparatus in the LSI manufacturing line.

Specifically, as shown in FIG. 15, the number of processing waiting products in each of the manufacturing apparatus is registered in association with the processing priority of the products at given time intervals of, e.g., one minute in a record of a number-of-processing-waiting-products control table on a computer memory device having, as items, at least an apparatus name, a time, a processing priority, and the number of processing waiting products.

In the fourth embodiment, it is assumed that that two levels of processing priorities (A "urgent") and (B "Moderate") are used and the processing priority A is higher in product processing priority than the processing priority B.

As shown in FIG. 16, the product processing time of the product, the processing priority thereof, and the processing waiting period of the product in each of the manufacturing apparatus are registered in a record of a product-processing control table on a computer memory device having, as items, at least an apparatus name, a processing time, a processing priority, and a processing waiting period.

On the other hand, an operation halt time at which the operation of each of the manufacturing apparatus is halted due to trouble occurring therein, maintenance thereof, or the like and a reoperation time at which the manufacturing apparatus is reoperated after the operation thereof is halted are registered in a record of the apparatus-halt-state control table on a memory of a computer having, as items, at least an apparatus name, an operation halt time, and a reoperation time shown in FIG. 3, similarly to Step S31 of the third embodiment.

First-Degree-of-Influence Calculating Step (Step S42)

Next, in Step S42, a first degree of influence is calculated for products of the same processing priority, i.e., in association with each of the processing priorities, based on a change in the number of processing waiting products during the operation halt period of the manufacturing apparatus.

Figure 17:
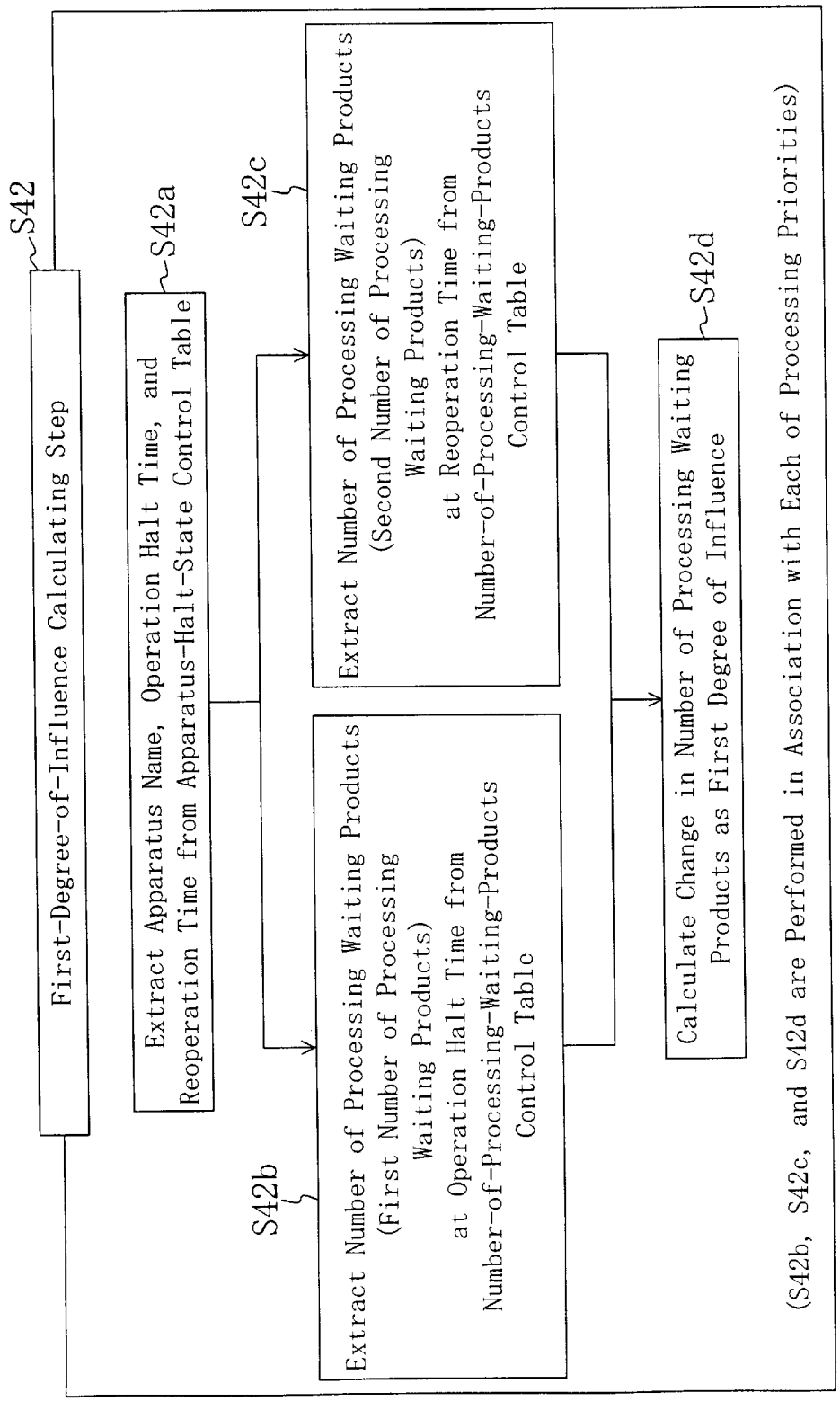
FIG. 17 is a flow chart illustrating the individual substeps of a first-degree-of-influence calculating step in the method of monitoring manufacturing apparatus according to the fourth embodiment.

A specific description will be given to Step S42 with reference to FIG. 17.

In Step S42a, when the reoperation time is registered in the apparatus-halt-state control table shown in FIG. 3, the registered reoperation time, the apparatus name, and the operation halt time, each corresponding to the registered reoperation time, are extracted from the apparatus-halt-state control table, similarly to Step S12a of the first embodiment.

In Step S42b, the number of processing waiting products at the extracted operation halt time of the manufacturing apparatus corresponding to the extracted apparatus name is extracted, in association with each of the processing priorities, as a first number of processing waiting products from the number-of-processing-waiting-products control table shown in FIG. 15 by using, as a search key, the extracted apparatus name and operation halt time. If the time coincident with the extracted operation halt time is not present in any record of the number-of-processing-waiting-products control table, the number of processing waiting products in a record having a time antecedent and closest to the extracted operation halt time is extracted as the first number of processing waiting products.

In Step S42c, the number of processing waiting products at the extracted reoperation time of the manufacturing apparatus corresponding to the extracted apparatus name is extracted, in association with each of the processing priorities, as a second number of processing waiting products from the number-of-processing-waiting-products control table shown in FIG. 15 by using, as a search key, the extracted apparatus name and reoperation time. If the time coincident with the extracted reoperation time is not present in any record of the number-of-processing-waiting-products control table, the number of processing waiting products in a record having a time posterior and closest to the extracted reoperation time is extracted as the second number of processing waiting products.

In Step S42d, the first degree of influence is calculated, in association with each of the processing priorities, based on the change in the number of processing waiting products during the operation halt period of the manufacturing apparatus, which is obtained in association with each of the processing priorities as a result of subtracting the first number of processing waiting products (the number of processing waiting products at the operation halt time of the manufacturing apparatus) obtained in association with each of the processing priorities in Step S42b from the second number of processing waiting products (the number of processing waiting products at the reoperation time of the manufacturing apparatus) obtained in association with each of the processing priorities in Step S42c.

A method of calculating the first degree of influence is not particularly limited. For example, the change in the number of processing waiting products may be calculated as the first degree of influence without any alterations or, alternatively, the result of multiplying the change in the number of processing waiting products by a given coefficient may also be calculated as the first degree of influence.

Specifically, if the manufacturing apparatus under the apparatus name of "E-1" has its operation halted at "2000/5/2 18:23" and is reoperated at "2000/5/3 04:04" as shown in FIG. 3 (Apparatus-Halt-State Control Table), e.g., the numbers of processing waiting products (first numbers of processing waiting products) of the processing priorities A and B at the operation halt time ("2000/5/2 18:23") of the manufacturing apparatus under the apparatus name of "E-1" are "2" and "4", respectively, and the numbers of processing waiting products (second numbers of processing waiting products) of the processing priorities A and B at the reoperation time ("2000/5/3 04:04") of the manufacturing apparatus under the apparatus name of "E-1" are "3" and "12", respectively, as shown in FIG. 15 (Number-of-Processing-Waiting-Products Control Table). Therefore, the changes in the numbers of processing waiting products of the processing priorities A and B are "3−2=1" and "12−4=8", respectively, so that the first degrees of influence corresponding to the processing priorities A and B become "1" and "8", respectively, when the changes in the numbers of processing waiting products are calculated as the first degrees of influence without any alterations.

Second-Degree-of-Influence Calculating Step (Step S43)

Next, in Step S43, a second degree of influence is calculated for products of the same processing priority, i.e., in association with each of processing priorities based on the change in processing waiting period during the operation halt period of the manufacturing apparatus.

Figure 18:
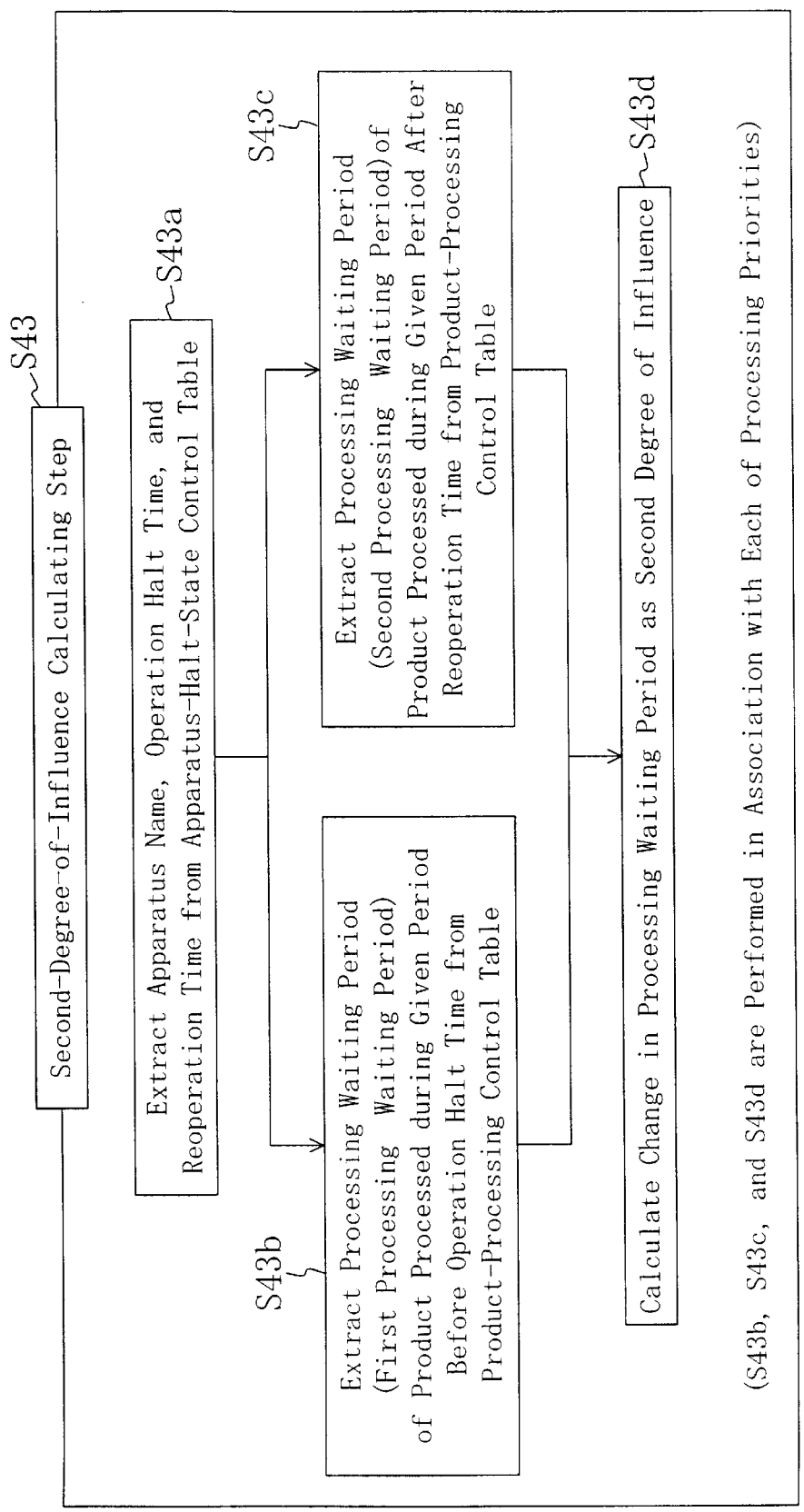
FIG. 18 is a flow chart illustrating the individual substeps of a second-degree-of-influence calculating step in the method of monitoring manufacturing apparatus according to the fourth embodiment.

A specific description will be given to Step S43 with reference to FIG. 18.

In Step S43a, when the reoperation time is registered in the apparatus-halt-state control table shown in FIG. 3, the registered reoperation time, the apparatus name and the operation halt time each corresponding to the registered reoperation time are extracted from the apparatus-halt-state control table, similarly to Step S22a of the second embodiment.

In Step S43b, the processing waiting period at the extracted operation halt time of the manufacturing apparatus corresponding to the extracted apparatus name is extracted, in association with each of processing priorities, as a first processing waiting period from the product-processing control table shown in FIG. 16 by using, as a search key, the extracted apparatus name and operation halt time. Specifically, a processing waiting period of the product processed in the manufacturing apparatus corresponding to the extracted apparatus name during a given period immediately before the extracted operation halt time is extracted as the first processing waiting period. If the given period is one hour, e.g., the processing waiting period in the record of the product-processing control table having the processing time between the time one hour before the extracted operation halt time and the operation time is extracted as the first processing waiting period. If a plurality of processing waiting periods corresponding to a processing priority are extracted from the product-processing control table, a mean value of the plurality of processing waiting periods is calculated as the first processing waiting period corresponding to the processing priority. If no processing waiting period corresponding to the processing priority is extracted from the product-processing control table, the first processing waiting period corresponding to the processing priority is assumed to be 0.

In Step S43c, the processing waiting period at the extracted reoperation time of the manufacturing apparatus corresponding to the extracted apparatus name is extracted, in association with each of processing priorities, as a second processing waiting period from the product-processing control table shown in FIG. 16 by using, as a search key, the extracted apparatus name and reoperation time. Specifically, a processing waiting period of the product processed in the manufacturing apparatus corresponding to the extracted apparatus name during a given period immediately after the extracted reoperation time is extracted as the second processing waiting period. If the given period is one hour, e.g., the processing waiting period in the record of the product-processing control table having the processing time between the extracted reoperation time and the time one hour after the extracted reoperation time is extracted as the second processing waiting period. If a plurality of processing waiting periods corresponding to a processing priority are extracted from the product-processing control table, a mean value of the plurality of processing waiting periods is calculated as the second processing waiting period corresponding to the processing priority. If no processing waiting period corresponding to the processing priority is extracted from the product-processing control table, the second processing waiting period corresponding to the processing priority is assumed to be 0.

In Step S43d, the second degree of influence is calculated, in association with each of the processing priorities, based on a change in processing waiting period during the operation halt period of the manufacturing apparatus, which is obtained in association with each of the processing priorities as a result of subtracting the first processing waiting period (the processing waiting period at the operation halt time of the manufacturing apparatus) obtained in association with each of the processing priorities in Step S43b from the second processing waiting period (processing waiting period at the reoperation time of the manufacturing apparatus) obtained in association with each of the processing priorities in Step S43c.

A method of calculating the second degree of influence is not particularly limited. For example, the change in processing waiting period may be calculated as the second degree of influence without any alteration or, alternatively, the result of multiplying the change in processing waiting period by a given coefficient may also be calculated as the second degree of influence.

Specifically, if the manufacturing apparatus under the apparatus name of "E-1" has its operation halted at "2000/5/2 18:23" and is reoperated at "2000/5/3 04:04" as shown in FIG. 3 (Apparatus-Halt-State Control Table), e.g., the processing waiting period of the product of the processing priority A processed by the manufacturing apparatus under the apparatus name of "E-1" between the time one hour before the operation halt time ("2000/5/2 18:23") and the operation halt time (product processed at the processing time of "2000/5/2 18:22") and the processing waiting period of the product of the processing priority B processed by the manufacturing apparatus under the apparatus name of "E-1" between the time one hour before the operation halt time ("2000/5/2 18:23") and the operation halt time (product processed at the processing time of "2000/5/2 17:42") are "29 minutes" and "43 minutes", respectively, as shown in FIG. 16 (Product-Processing Control Table). On the other hand, the processing waiting period of the product of the processing priority A processed by the manufacturing apparatus under the apparatus name of "E-1" between the reoperation time ("2000/5/3 04:04") and the time one hour after the reoperation time (product processed at the processing time of "2000/5/3 04:05") and the processing waiting period of the product of the processing priority B processed by the manufacturing apparatus under the apparatus name of "E-1" between the reoperation time ("2000/5/3 04:04") and the time one hour after the reoperation time (product processed at the processing time of "2000/5/3 04:47") are "659 minutes" and "643 minutes", respectively. Accordingly, the changes in the processing waiting periods of the products of the processing priorities A and B are "659 minutes−29 minutes=630 minutes" and "643 minutes−43 minutes=600 minutes", respectively, so that the respective second degrees of influences corresponding to the processing priorities A and B become "630" and "600" when the changes in processing waiting period are calculated as the second degrees of influence without any alterations.

Third-Degree-of-Influence Calculating Step (S44)

Next, in Step S44, a third degree of influence is calculated for products of the same processing priority, i.e., in association with each of the processing priorities based on the first degree of influence (change in the number of processing waiting products) obtained in association with each of the processing priorities in Step S42 and on the second degree of influence (change in processing waiting period) obtained in association with each of the processing priorities in Step S43.

Figure 19:
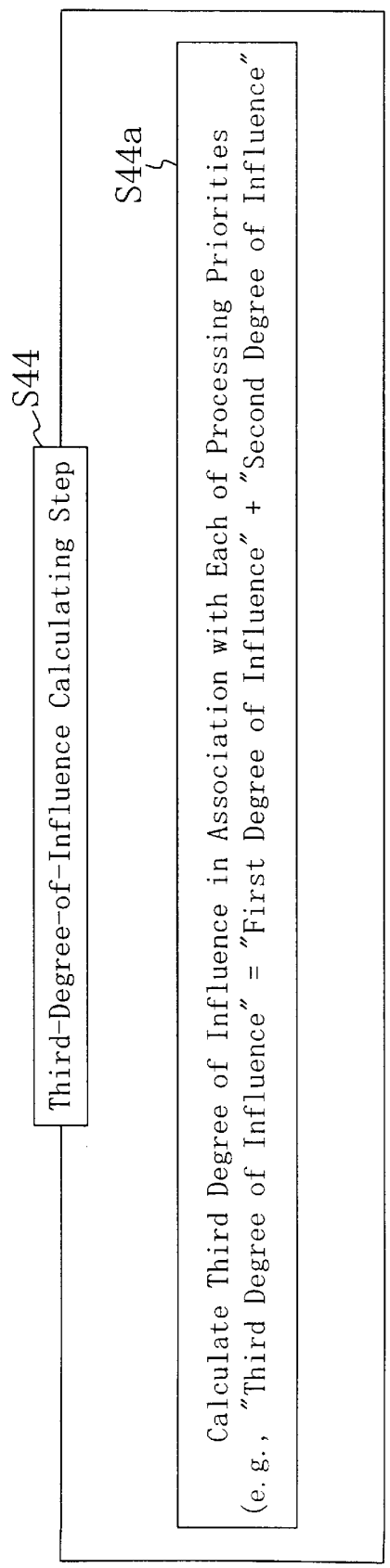
FIG. 19 is a flow chart illustrating the individual substeps of a third-degree-of-influence calculating step in the method of monitoring manufacturing apparatus according to the fourth embodiment.

A specific description will be given to Step S44 with reference to FIG. 19.

In Step S44a, e.g., the sum of the first degree of influence obtained in association with each of the processing priorities in Step S42 and the second degree of influence obtained in association with each of the processing priorities in Step S43 is calculated as a third degree of influence corresponding to each of the processing priorities, which is given by the following equation:

"Third Degree of Influence"="First Degree of Influence"+"Second Degree of Influence".

Specifically, if the manufacturing apparatus under the apparatus name of "E-1" has its operation halted at "2000/5/2 18:23" and is reoperated at "2000/5/3 04:04" as shown in FIG. 3 (Apparatus-Halt-State Control Table), e.g., the first degrees of influence corresponding to the processing priorities A and B are "1" and "8" and the second degrees of influence corresponding to the processing priorities A and B are "630", and "600", as stated previously. In this case, therefore, the third degrees of influence corresponding to the processing priorities A and B become "1+630=631" and "8+600=608".

Halt Influence Evaluating Step (S45)

Next, in Step S45, the halt influence is evaluated based on each of the third degrees of influence obtained in association with each of the processing priorities in Step S44.

Figure 20:
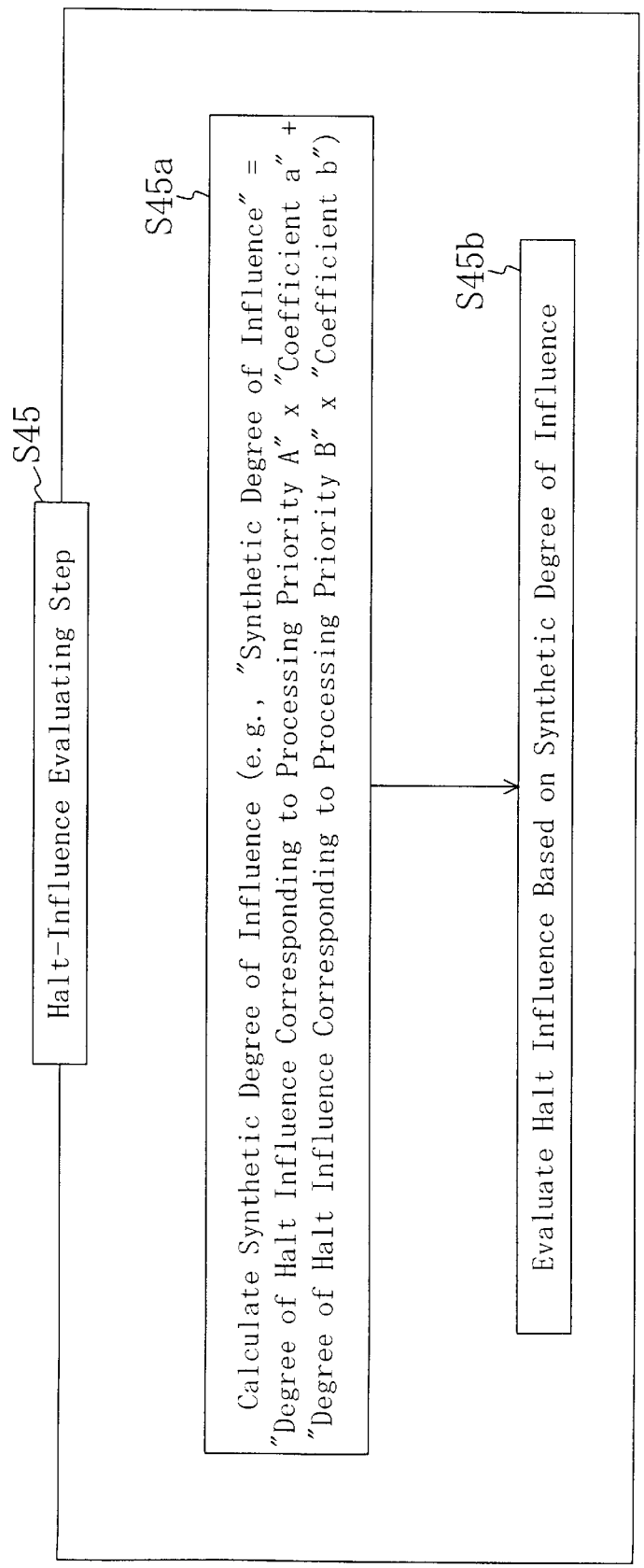
FIG. 20 is a flow chart illustrating the individual substeps of a halt-influence evaluating step in the method of monitoring manufacturing apparatus according to the fourth embodiment.

A specific description will be given to Step S45 with reference to FIG. 20.

In Step S45a, each of the third degrees of influence obtained in association with the individual processing priorities in Step S44 is provided with a weight according to the height of the corresponding processing priority and the third degrees of influence each provided with a weight are summed up such that the total sum is calculated as a synthetic degree of influence.

A method of providing each of the third degrees of influence with a weight is not particularly limited. For example, the third degree of influence corresponding to a higher processing priority is provided with a larger weight.

In Step S45b, the halt influence is evaluated based on the synthetic degree of influence calculated in Step S45a. At this time, the halt influence is judged to be greater as the synthetic degree of influence is higher.

Specifically, since the fourth embodiment uses the two levels of processing priorities A and B as the processing priorities, the following equations are satisfied:

"Synthetic Degree of Influence"="Third Degree of Influence Corresponding to Processing Priority A with Weight"+"Third Degree of Influence Corresponding to Processing Priority B with Weight"

"Third Degree of Influence Corresponding to Processing Priority A with Weight"="Third Degree of Influence Corresponding to Processing Priority A"×"Coefficient a"

"Third Degree of Influence Corresponding to Processing Priority B with Weight"="Third Degree of Influence Corresponding to Processing Priority B"×"Coefficient b"

where the coefficients a and b are determined based on a characteristic (the number of manufacturing apparatus (total number), the number of products processed simultaneously, the number of manufacturing apparatus of the same type, or the like) of the manufacturing line.

Therefore, if the manufacturing apparatus under the apparatus name of "E-1" has its operation halted at "2000/5/2 18:23" and is reoperated at "2000/5/3 04:04" as shown in FIG. 3 (Apparatus-Halt-State Control Table), e.g., the synthetic degree of influence calculated by assuming the coefficients a and b to be "10" and "2", e.g., is "631×10+608×2=7526" since the third degrees of influence corresponding to the processing priorities A and B are "631" and "608", as described above. This allows quantitative evaluation of the halt influence when the manufacturing apparatus under the apparatus name of "E-1" has its operation halted at "2000/5/2 18:23".

Thus, the fourth embodiment calculates the first degree of influence based on the value obtained by subtracting the first number of processing waiting products at the operation halt time of the manufacturing apparatus from the second number of processing waiting products at the reoperation time thereof, calculates the second degree of influence based on the value obtained by subtracting the first processing waiting period at the operation halt time of the manufacturing apparatus from the second processing waiting period at the reoperation time thereof, calculates the third influence based on the first and second degrees of influence, and evaluates the halt influence based on the third degree of influence. Since the halt influence can be evaluated by using the change in the number of processing waiting products and the change in processing waiting period during the operation halt period of the manufacturing apparatus, the halt influence can be evaluated in consideration of the busyness of the manufacturing apparatus during the operation halt period thereof. This allows precise evaluation of the halt influence even in a manufacturing line for electronic devices or the like in which busyness differs greatly from one manufacturing apparatus to another. This also allows more precise evaluation of the halt influence than in the case where the halt influence is evaluated by using either one of the change in the number of processing waiting products and the change in processing waiting period during the operation halt period of the manufacturing apparatus.

Moreover, the fourth embodiment calculates each of the first and second degrees of influences in association with each of the processing priorities, calculates the third degree of influence in association with each of the processing priorities and based on each of the first and second degrees of influence calculated in association with each of the processing priorities, and evaluates the halt influence based on the third degree of influence calculated in association with each of the processing priorities. This allows precise evaluation of the halt influence even in a manufacturing line for manufacturing a plurality of products of different processing priorities. When the halt influence is evaluated based on the third influence calculated in association with each of the processing priorities, the halt influence is evaluated based on the synthetic degree of influence which is the total sum of the individual third degrees of influences each provided with a weight according to a height of the corresponding processing priority. This allows more precise evaluation of the halt influence considering actual conditions in a manufacturing line, including the different processing priorities of the individual products.

In the fourth embodiment, a method of registering data in the number-of-processing-waiting-products control table, the product-processing control table, or the apparatus-halt-state control table, searching data therein, or extracting data therefrom is not particularly limited. Data may be registered, searched, or extracted by using a SQL or the like provided in a DBMS or the like.

Although the number-of-processing-waiting-products control table, the product-processing control table, or the apparatus-halt-state control table is present on the memory of the computer in the fourth embodiment, it may be present on a storage medium on a computer network that can be accessed by the computer.

Although the fourth embodiment has registered the number of processing waiting products at given time intervals in the number-of-processing-waiting-products control table in Step S41, it is also possible to register the number of processing waiting products at predetermined times.

In the fourth embodiment, the timing for registering the processing time and the processing waiting period in the product-processing control table in Step S41 is not particularly limited. It is also possible to register the processing time and the processing waiting period at the initiation or completion of product processing performed by the manufacturing apparatus.

In the fourth embodiment, the timing for registering the operation halt time or the reoperation time of the apparatus-halt-state control table in Step S41 is not particularly limited. It is also possible to register the operation halt time when the operation of the manufacturing apparatus is halted and register the reoperation time when the manufacturing apparatus is reoperated or register each of the operation halt time and the reoperation time when the manufacturing apparatus is reoperated.

Although the fourth embodiment has extracted, when the reoperation time is registered in the apparatus-halt-state control table, the registered reoperation time, the apparatus name, and the operation halt time each corresponding to the registered reoperation time from the apparatus-halt-state control table in Step S42 or S43, it is also possible to extract the apparatus name, the operation halt time, and the reoperation time from the apparatus-halt-state control table at predetermined times or given time intervals instead.

Although the fourth embodiment has obtained, as the first number of processing waiting products, the number of processing waiting products at the operation halt time of the manufacturing apparatus and obtained, as the second number of processing waiting products, the number of products at the reoperation time of the manufacturing apparatus in Step S42, it is also possible to obtain, as the first number of processing waiting products, the number of processing waiting products at a time slightly before the operation halt time of the manufacturing apparatus (about 1 to 60 minutes) and obtain, as the second number of processing waiting products, the number of processing waiting products at a time slightly after the reoperation time of the manufacturing apparatus (about 1 to 60 minutes) instead.

Although the fourth embodiment has calculated, as the first processing waiting period, the processing waiting period of the product processed during the given period immediately before the operation halt time of the manufacturing apparatus and obtained, as the second processing waiting period, the processing waiting period of the product processed during the given period immediately after the reoperation time of the manufacturing apparatus in Step S43, it is also possible to calculate, as the first processing waiting period, the processing waiting period of the product processed during the given period immediately before a time slightly before the operation halt time of the manufacturing apparatus (about 1 to 60 minutes) and obtain, as the second processing waiting period, the processing waiting period of the product processed during the given period immediately after the time slightly after the reoperation time of the manufacturing apparatus (about 1 to 60 minutes) instead.

In the fourth embodiment, the given period used in Step S43 is not particularly limited. The given period may also be determined based on the time required for product processing performed by the manufacturing apparatus. This allows the processing waiting period to be calculated in accordance with the time required for product processing performed by the manufacturing apparatus. In this case, the given period is preferably determined to be longer as the time required for product processing performed by the manufacturing apparatus is longer. This ensures the calculation of the processing waiting period.

Although the fourth embodiment has calculated, as the third degree of influence, the sum of the first and second degrees of influence in Step S44, it is also possible to provide at least one of the first and second degrees of influence with a weight and calculate, as the third degree of influence, the sum of the first and second degrees of influence with the weight. If each of the first and second degrees of influence is provided with a weight, "Third Degree of Influence"="First Degree of Influence with Weight"+"Second Degree of Influence with Weight"

"First Degree of Influence with Weight"="First Degree of Influence"×"Coefficient α"

"Second Degree of Influence with Weight"="Second Degree of Influence"×"Coefficient β"

are satisfied. Here, the coefficients α and β are determined based on a characteristic of the manufacturing apparatus or on a characteristic of the manufacturing line. As a result, the third influence can be calculated in accordance with the characteristic of each of the manufacturing apparatus even in a manufacturing line composed of a plurality of manufacturing apparatus of entirely different types, properties, performances, or the like. This allows the halt influence to be evaluated in accordance with the characteristic of each of the manufacturing apparatus. In this case, the second degree of influence is preferably provided with a larger weight by increasing the value of the coefficient β as the time required for product processing performed by the manufacturing apparatus is longer. This allows more precise calculation of the third degree of influence and more precise evaluation of the halt influence.

Although the fourth embodiment has performed Step S44, i.e., the third-degree-of-influence calculating step and Step S45, i.e., the halt-influence evaluating step as different steps, it is also possible to perform the third-degree-of-influence calculating step in the halt-influence evaluating step.

Although the fourth embodiment has provided each of the third degrees of influences calculated in association with the individual processing priorities in Step S45 with a weight according to the height of the corresponding processing priority, summed up the third degrees of influence each provided with the weight, and evaluated the halt influence based on the total sum, i.e., the synthetic degree of influence, it is also possible to evaluate the halt influence in association with each of the processing priorities based on each of the third degrees of influence calculated in association with the individual processing priorities. In this case, the halt influence may be judged to be greater as the corresponding third degree of influence calculated is higher.

Although the fourth embodiment has used the two levels of processing priorities (A and B) as the processing priorities, it is also possible to use multiple levels of processing priorities not less than three levels. In this case, it is possible to multiply each of the third degrees of influence obtained in association with the individual processing priorities in Step S44 by a coefficient according to the height of the corresponding processing priority (which increases as the processing priority is higher) to provide each of the third degrees of influence with a weight, summing up the third degrees of influence each provided with the weight to calculate the synthetic degree of influence which is the total sum, and evaluate the halt influence based on the synthetic degree of influence calculated.

What is claimed is:

1. A method for evaluating a manufacturing line that sequentially processes a product using a plurality of manufacturing apparatuses to manufacture the product, the method evaluating an influence, which is caused by a halting of any of the manufacturing apparatuses, on the manufacturing line as a halt influence, the method comprising the step of:

evaluating the halt influence based on a difference between a first number of processing waiting products and a second number of processing waiting products, the first number of processing waiting products being a number of products in a processing waiting state in the halted manufacturing apparatus at a time when or before the halted manufacturing apparatus is being halted, the second number of processing waiting products being a number of products in the processing waiting state in the halted manufacturing apparatus at a time when or after the halted manufacturing apparatus resumes operation.

2. The method of claim 1, wherein the halt influence is judged to be greater as a value obtained by the difference between the first number of processing waiting products from the second number of processing waiting products is larger.

3. A method for evaluating a manufacturing line that sequentially processes a product using a plurality of manufacturing apparatuses to manufacture the product, the method evaluating an influence, which is caused by a halting of any of the manufacturing apparatuses, on the manufacturing line as a halt influence, the method comprising the step of:

evaluating the halt influence based on a difference between a first processing waiting period and a second processing waiting period, the first processing waiting period being a period in which a product, processed by the halted manufacturing apparatus during a given period when or before the halted manufacturing apparatus is being halted, is in a processing waiting state in the halted manufacturing apparatus, the second processing waiting period being a period in which a product, processed by the halted manufacturing apparatus during a given period when or after the halted manufacturing apparatus resumes operation, is in the processing waiting state in the halted manufacturing apparatus.

4. The method of claim 3, wherein the halt influence is judged to be greater as a value obtained by the difference between the first processing waiting period from the second processing waiting period is larger.

5. A method for evaluating a manufacturing line that sequentially processes a product using a plurality of manufacturing apparatuses to manufacture the product, the method evaluating an influence, which is caused by a halting of any of the manufacturing apparatuses, on the manufacturing line as a halt influence, the method comprising the steps of:

calculating a first degree of influence based on the difference in value between the first number of processing waiting products and the second number of processing waiting products, the first number of processing waiting products being a number of products in a processing waiting state in the halted manufacturing apparatus at a time when or before the halted manufacturing apparatus is being halted, the second number of processing waiting products being a number of products in the processing waiting state in the halted manufacturing apparatus at a time when or after the halted manufacturing apparatus resumes operation;

calculating a second degree of influence based on the difference in value between the first processing waiting period and the second processing waiting period, the first processing waiting period being a period in which a product, processed by the halted manufacturing apparatus during a given period when or before the halted manufacturing apparatus is being halted, is in a processing waiting state in the halted manufacturing apparatus, the second processing waiting period being a period in which a product, processed by the halted manufacturing apparatus during a given period when or after the halted manufacturing apparatus resumes operation, is in the processing waiting state in the halted manufacturing apparatus; and evaluating the halt influence based on the first and second degrees of influence.

6. The method of claim 3 or 5, wherein the given period is determined based on a time required for product processing performed by the halted manufacturing apparatus.

7. The method of claim 6, wherein the given period is determined to be longer as the time required for product processing performed by the halted manufacturing apparatus is longer.

8. The method of claim 5, wherein the step of evaluating the halt influence includes providing at least one of the first and second degrees of influence with a weight based on a characteristic of the halted manufacturing apparatus and then evaluating the halt influence by using the first and second degrees of influence with the weight.

9. The method of claim 8, wherein the step of evaluating the halt influence includes, when at least one of the first and second degrees of influence is provided with the weight, providing the second degree of influence with a larger weight as a time required for product processing performed by the halted manufacturing apparatus is longer.

10. The method of claim 5, wherein the step of calculating the first degree of influence includes calculating the first degree of influence in association with each of priorities with which product processing is performed by the halted manufacturing apparatus, the step of calculating the second degree of influence includes calculating the second degree of influence in association with each of the priorities, and the step of evaluating the halt influence includes calculating a third degree of influence in association with each of the priorities based on the corresponding ones of the first and second degrees of influence calculated in association with the individual priorities and evaluating the halt influence based on several of the third degrees of influence calculated in association with the individual priorities.

11. The method of claim 10, wherein the step of evaluating the halt influence includes, when the halt influence is evaluated based on several of the third degrees of influence calculated in association with the individual priorities, providing each of the third degrees of influence with a weight according to a height of the corresponding one of the priorities, summing up the third degrees of influence each provided with the weight, and evaluating the halt influence based on the total sum.

* * * * *

UNITED STATES PATENT AND TRADEMARK OFFICE
CERTIFICATE OF CORRECTION

PATENT NO. : 6,662,065 B2
DATED : December 9, 2003
INVENTOR(S) : Shigeru Matsumoto It is certified that error appears in the above-identified patent and that said Letters Patent is hereby corrected as shown below:

<u>Title page,</u>
Item [54], Title, delete "METHOD OF MONITORING MANUFACTURING APPARATUS" insert -- METHOD OF EVALUATING MANUFACTURING LINE --
Item [75], Inventor, delete "Shigeru Matsumoto, Higashiosaka (JP)" insert -- Shigeru Matsumoto, Osaka (JP) --;

Signed and Sealed this

Fourth Day of May, 2004

JON W. DUDAS
*Acting Director of the United States Patent and Trademark Office*